United States Patent
Matsumoto et al.

[11] Patent Number: 5,857,537
[45] Date of Patent: Jan. 12, 1999

[54] MOTORIZED BICYCLE

[75] Inventors: Toshihiro Matsumoto, Nishiwaki; Tatsuaki Tanaka, Kasai; Toshihiro Suhara, Taka-gun, all of Japan

[73] Assignee: Sanyo Electric Co., Ltd., Osaka, Japan

[21] Appl. No.: 607,573

[22] Filed: Feb. 27, 1996

[30] Foreign Application Priority Data

Feb. 28, 1995 [JP] Japan .................................. 7-040488
Feb. 28, 1995 [JP] Japan .................................. 7-040489

[51] Int. Cl.$^6$ .................................................. B62M 23/02
[52] U.S. Cl. ......................... 180/206; 180/205; 180/65.2
[58] Field of Search .................................. 180/206, 207, 180/205, 220, 65.1, 65.2, 65.8, 907

[56] References Cited

U.S. PATENT DOCUMENTS

| | | | |
|---|---|---|---|
| 5,370,200 | 12/1994 | Takata ..................................... | 180/205 |
| 5,474,148 | 12/1995 | Takata ..................................... | 180/207 |
| 5,505,277 | 4/1996 | Suganuma et al. ...................... | 180/207 |
| 5,664,636 | 9/1997 | Ikuma et al. ............................ | 180/206 |

FOREIGN PATENT DOCUMENTS

| | | |
|---|---|---|
| 0559231 | 9/1993 | European Pat. Off. . |
| 0569954 | 11/1993 | European Pat. Off. . |
| 0650887 | 5/1995 | European Pat. Off. . |
| 04100790 | 4/1992 | Japan . |
| 4100790 | 4/1992 | Japan . |
| 05246378 | 9/1993 | Japan . |
| 5246378 | 9/1993 | Japan . |

OTHER PUBLICATIONS

European Search Report. (EP 96–30–1371).
Patent Abstract of Japan vol. 17, No. 70a (M–1535), filed Dec. 24, 1993. (J.P. 5246378).
Patent Abstract of Japan vol. 16, No. 339 (M–1284), filed Jul. 22, 1992. (JP4100790).
English Language Abstract of Japanese Patent Publication No. HEI 4–100179.
English Language Abstract of Japanese Patent Publication No. HEI 5–246378.

*Primary Examiner*—Anne Marie Boehler
*Attorney, Agent, or Firm*—Greenblum & Bernstein, P.L.C.

[57] ABSTRACT

A motorized bicycle includes an electric motor, a motor current detector, a pedaling force detector and a controller. The controller compares the range of fluctuation in a pedaling force detected by the pedaling force detector with a predetermined range value, and stops the driving of the electric motor if the fluctuation range of the pedaling force is kept smaller than the predetermined range value for more than a predetermined time period.

15 Claims, 29 Drawing Sheets

MOTORIZED BICYCLE

BACKGROUND OF THE INVENTION

1. Field of the Invention

The present invention relates to a motorized bicycle and, more particularly, to a motorized bicycle including a man-power driving section and an electromotive driving section and adapted to assist a man-power driving force with an electromotive driving force by driving an electric motor depending on the man-power driving force.

2. Description of Related Art

A conventional motorized bicycle is disclosed in Japanese Unexamined Patent Publication No.5-246378 (1993), which includes a driving system driven by man-power and a driving system driven by an electric motor and is adapted to control the output of the electric motor by detecting a driving force of the man-power driving system, i.e., a pedaling force (a force applied onto pedals).

Specifically, as shown in FIG. 31, the pedaling force, the current of the motor, and the speed of the bicycle are detected by a pedaling force detecting section 201, a motor current detecting section 202 and a bicycle speed detecting section 203, respectively, and these data are inputted into a controller 204, which controls a voltage to be applied to a motor 205. More specifically, the voltage (average voltage) to be applied to the motor 205 is controlled by a switching element or the like, so that the motor 205 generates a torque depending on the detected pedaling force to drive a wheel 207 via a decelerator 206.

If a signal is outputted from the pedaling force detecting section 201 due to a noise in the motorized bicycle when no force is applied to the pedals, however, the motor 205 is erroneously operated. That is, when the motorized bicycle is not pedaled, the output from the pedaling force detecting section 201 fluctuates between zero and a level slightly greater than zero. This causes the motor 205 to be driven and stopped in an unstable manner.

To solve this problem, the motor is adapted to be driven only when the pedaling force exceeds a predetermined threshold. Where the motorized bicycle is designed such that the driving of the motor is stopped when the pedaling force is less than the threshold, however, an assist by the motor is not available when the motorized bicycle is driven with a pedaling force less than the threshold.

Where the motorized bicycle is designed so as to prevent the driving of the motor from being stopped when the pedaling force becomes less than the threshold after the driving of the motor is once started with the pedaling force exceeding the threshold, the aforesaid problem may occur. That is, the motor is driven and stopped in an unstable manner when no pedaling force is applied.

A conventional motorized bicycle of another type is proposed, for example, in Japanese Unexamined Patent Publication No. 4-100790 (1992), which includes a pedaling force sensor for detecting main driving force and a motor current sensor for detecting auxiliary driving force, wherein the output of a motor is controlled on the basis of values detected by these sensors.

However, the outputs of these sensors each include an offset (outputted when no input is applied thereto). The offset fluctuates due to temperature drift, and varies depending on the sensors (even if sensors of the same type are used). Therefore, it is difficult to correct the outputs of these sensors to obtain true detection values.

SUMMARY OF THE INVENTION

In view of the aforesaid problems, it is an object of the present invention to provide a motorized bicycle having a motor stopping function for stopping the driving of an electric motor thereof if the range of fluctuation in a pedaling force is kept small for more than a predetermined time period and it is considered that the bicycle is not pedaled.

It is another object of the present invention to provide a motorized bicycle in which the driving of an electric motor thereof is stopped if the aforesaid condition is satisfied and if the speed of the bicycle is zero or the bicycle is stopped.

It is still another object of the present invention to provide a motorized bicycle in which a pedaling force threshold is updated for stopping the driving of an electric motor thereof even if the pedaling force is detected, e.g., if a user places his foot on a pedal thereof when the bicycle is stopped with the brake thereof being applied, and the threshold once raised can be updated to be lowered.

It is yet another object of the present invention to provide a motorized bicycle which is capable of accurately detecting a main driving force and an auxiliary driving force to adequately control the auxiliary driving force.

In accordance with one aspect of the present invention, there is provided a motorized bicycle comprising: man-power driving means for driving a wheel by man-power; a man-power sensor for detecting a driving force of the man-power driving means; electromotive driving means for driving the wheel by an electric motor; an electromotive-power sensor for detecting a driving force of the electromotive driving means; control means for controlling the driving force of the electromotive driving means on the basis of signals from the man-power sensor and the electromotive-power sensor; and fluctuation range detecting means for detecting the range of fluctuation in the driving force detected by the man-power sensor, wherein the control means includes operation stopping means for comparing the fluctuation range detected by the fluctuation range detection means with a predetermined range value and, stopping the operation of the electromotive driving means.

In accordance with another aspect of the present invention, there is provided a motorized bicycle comprising: man-power driving means for driving a wheel by man-power; a man-power sensor for detecting a driving force of the man-power driving means; electromotive driving means for driving the wheel by an electric motor; an electromotive-power sensor for detecting a driving force of the electromotive driving means; and control means for controlling the driving force of the electromotive driving means on the basis of signals from the man-power sensor and the electromotive-power sensor, wherein the control means includes sensor correction means for correcting an output of at least one of the man-power sensor and the electromotive-power sensor by employing as a sensor detection value a value obtained by subtracting a predetermined reference value from the sensor output, and reference value updating means for updating the determined reference value by employing the sensor output as a new reference value if the sensor output is smaller than the predetermined reference value.

The foregoing and other objects, features and attendant advantages of the present invention will become more apparent from the following detailed description of the preferred embodiments. However, it should be understood that the preferred embodiments are only illustrative of the invention, since various changes and modifications can be made within the spirit and scope of the invention as would be apparent to those skilled in the art.

BRIEF DESCRIPTION OF THE DRAWINGS

The present invention will be detailed in conjunction with the accompanying drawings, but the invention is not limited thereto.

DETAILED DESCRIPTION OF THE PREFERRED EMBODIMENTS

Figure 1:
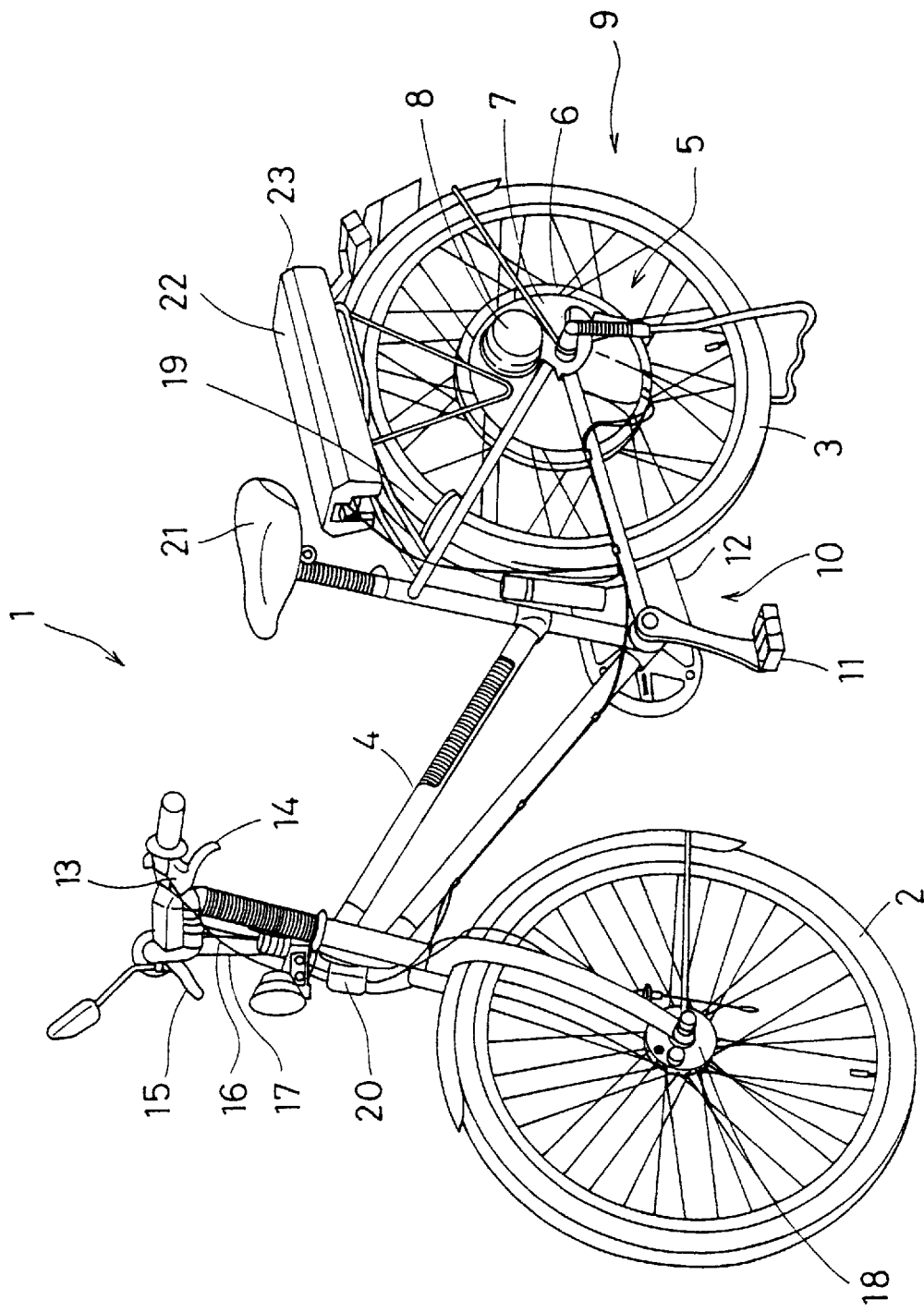
FIG. 1 is a full perspective view illustrating a motorized bicycle according to EMBODIMENT 1 of the present invention.

A motorized bicycle according to the present invention includes: man-power driving means for driving a wheel by man-power; a man-power sensor for detecting a driving force of the man-power driving means; electromotive driving means for driving the wheel by an electric motor; an electromotive-power sensor for detecting a driving force of the electromotive driving means; control means for controlling the driving force of the electromotive driving means on the basis of signals from the man-power sensor and the electromotive-power sensor; and fluctuation range detecting means for detecting the range of fluctuation in the driving force detected by the man-power sensor, wherein the control means includes operation stopping means for comparing the fluctuation range detected by the fluctuation range detecting means with a predetermined range value and, stopping the operation of the electromotive driving means.

The electromotive driving means includes an electric motor and a transmission system such as gears or a belt for transmitting the torque of the electric motor to a wheel. The driving force of the electromotive driving means is a torque generated by the electric motor. The electromotive-power sensor for detecting the torque is typically adapted to detect a current flowing through the electric motor by means of a current sensor and calculate the torque of the electric motor from the value of the detected current.

The electric motor may be, for example, a brushless motor or a brush motor, among which a DC brush motor is preferably used because of the facility in control. The battery which supplies a electric power to the electric motor may be, for example, a dry battery such as a manganese battery, a mercury battery or an alkali-manganese battery or a rechargeable battery such as a lead storage battery, an alkali storage battery, a silver oxide-zinc storage battery, a silver oxide-cadmium battery or a nickel-cadmium battery.

The battery may be detachably housed in a casing provided above the driving wheel or detachably housed inside a tubular pipe that constitutes the body frame of the bicycle.

The man-power driving means is a device for driving the wheel by man power. Any of various driving units such as a combination of pedals and a chain, and a combination of pedals, gears and a rotary shaft can be used as the man-power driving means. The driving force of the man-power driving means is a rotational force for rotating the wheel which is generated by a pedaling force applied to the pedals. Therefore, the driving force of the man-power driving means may be expressed as "pedaling force" for a common bicycle.

Used as the man-power sensor may be any of various torque detecting units such as a potentiometer and spring for detecting a pedaling force, for example, if the bicycle has pedals.

Conveniently used as the control means and the fluctuation range detecting means is a microprocessor including a CPU, an ROM, an RAM and an I/O port.

Used as the operation stopping means is a combination of a switching element for opening and closing a supply circuit to stop power supply to the electromotive driving means, a switching element controller for controlling the switching element, and a microprocessor having the same construction as described above for providing an instruction to the switching element controller.

In the motorized bicycle with the aforesaid construction, the operation stopping means preferably functions when the fluctuation range detected by the fluctuation range detecting means is kept smaller than the predetermined range value for more than a predetermined time period.

The motorized bicycle with the aforesaid construction preferably further includes a bicycle speed sensor for detecting the speed of the bicycle. In this case, the operation stopping means preferably functions when the fluctuation range detected by the fluctuation range detecting means is kept smaller than the predetermined range value for more than the predetermined time period and no output is applied from the bicycle speed sensor.

Used as the bicycle speed sensor in the present invention is any of various known sensors which are adapted to mechanically, electromagnetically or optically detect the rotation of the wheel.

Another motorized bicycle in accordance with the present invention includes: man-power driving means for driving a wheel by man-power; a man-power sensor for detecting a driving force of the man-power driving means; electromotive driving means for driving the wheel by an electric motor; an electromotive-power sensor for detecting a driving force of the electromotive driving means; control means for controlling the driving force of the electromotive driving means on the basis of signals from the man-power sensor and the electromotive-power sensor; and fluctuation range detecting means for detecting the range of fluctuation in the driving force detected by the man-power sensor, wherein the control means includes operation starting means for comparing the driving force detected by the man-power sensor with a predetermined threshold value and for starting the operation of the electromotive driving means when the driving force detected by the man-power sensor exceeds the predetermined threshold value, and threshold value updating means for comparing the fluctuation range detected by the fluctuation range detecting means with a predetermined range value and updating the predetermined threshold value to a sum of a predetermined value and the driving force detected by the man-power sensor if the detected fluctuation range is kept smaller than the predetermined range value for more than a predetermined time period.

Conveniently used as the threshold value updating means is a microprocessor including a CPU, an ROM, an RAM and an I/O port.

Used as the operation starting means and the operation stopping means is a combination of a switching element for opening and closing a supply circuit to stop power supply to the electromotive driving means, a switching element controller for controlling the switching element, and a microprocessor having the same construction as described above for providing an instruction to the switching element controller.

In the motorized bicycle with the aforesaid construction, the control means more preferably further includes the operation stopping means, the operation starting means and the threshold value updating means described above.

In the motorized bicycle with the aforesaid construction, the control means more preferably further includes threshold value lowering means for comparing the predetermined threshold value with the sum of the predetermined value and the driving force detected by the man-power sensor and lowering the predetermined threshold value for the updating thereof by employing the sum as a new predetermined threshold value if the sum is smaller than the predetermined threshold value.

Conveniently used as the threshold value lowering means is a microprocessor including a CPU, an ROM, an RAM and an I/O port.

The motorized bicycle according to the present invention is never driven only by the driving force of the electromotive driving means. That is, only when the driving force of the man-power driving means is applied to the motorized bicycle, the electromotive driving means is operated and the driving force of the electromotive driving means is applied to the motorized bicycle to assist the driving force of the man-power driving means.

When the speed of the bicycle is lower than 15 km/h, the driving force of the electromotive driving means is preferably controlled so that the driving force of the electromotive driving means becomes equivalent to that of the man-power driving means (assist ratio: 1). When the speed of the bicycle is lower than 24 km/h and not lower than 15 km/h, the driving force of the electromotive driving means is preferably controlled so as to be inversely proportional to the speed of the bicycle. When the speed of the bicycle is not lower than 24 km/h, the driving force of the electromotive driving means is preferably controlled to be zero (assist ratio: 0).

From this view point, the driving force of the man-power driving means can be expressed as a main driving force generated by man power, and the driving force of the electromotive driving means can be expressed as an auxiliary driving force generated by the electric motor.

The main driving force by man power is generated by a user pressing down the pedals, and transmitted to a drive wheel. Used as transmission means for transmitting the main driving force is any of those known in the art for use in a bicycle.

The auxiliary driving force by the electric motor is applied from the electric motor to assist the main driving force when the driving force generated by man power is applied to the bicycle.

Exemplary means for transmitting the auxiliary driving force generated by the electric motor to the drive wheel of the bicycle include transmission means for transmitting the output of the electric motor to the rotary shaft of the drive shaft via plural-stage gears and a belt or a chain, and transmission means for decelerating the rotation of an output shaft of the electric motor by gears and then transmitting the rotational force to a tire or a rim of the drive wheel.

The electric motor is preferably connected to the drive wheel via a one-way clutch to prevent the electric motor from braking the drive wheel when the rotational speed of the drive wheel is higher than the rotational driving speed of the electric motor.

An exemplary electric motor is a DC brush motor of permanent magnet exciting type to which power is supplied from a battery such as a nickel-cadmium battery via a switching element such as a switching transistor or thyristor.

The main driving force generated by man power is detected by the man-power sensor (pedaling force sensor). The pedaling force sensor includes an element which is incorporated in a transmission system connecting the pedals to the drive wheel and adapted to be distorted or deformed by a mechanical force, and a sensor for converting the degree of the distortion or deformation into an electrical signal (e.g., a strain gage, potentiometer or differential transducer).

The auxiliary driving force generated by the electric motor is detected by the electromotive-power sensor (assist force sensor). A current sensor for detecting the current of the electric motor is preferably used as the assist force sensor, as the torque of the electric motor is directly proportional to the current of the electric motor. Alternatively, a sensor which is provided in a transmission system connecting the electric motor to the drive wheel and adapted to detect distortion or deformation of an element incorporated therein may be used. The current sensor employs a shunt resistor, a hall element and the like. The output of the sensor is preferably amplified by an amplifier such as an operational amplifier if the output level is very low.

The control means is adapted to control the electric motor by way of pulse width modulation (PWM). More specifically, the control means outputs pulse signals on a predetermined cycle to turn on and off the switching element, then processes signals outputted from the respective sensors, and changes the pulse duty ratio of the outputted signals to control the electric motor so that the ratio of the auxiliary driving force to the main driving force (i.e., assist ratio) is adjusted to a preliminarily programmed value. Used as the control means is a microprocessor having the aforesaid construction, i.e., including a CPU, an ROM and an RAM.

The motorized bicycle further includes a bicycle speed sensor for detecting the speed of the bicycle, and the reference value updating means may be adapted to perform the reference value updating process described above when the speed of the bicycle is zero. The bicycle speed sensor is adapted to detect the traveling speed of the motorized bicycle, and includes a rotary encoder or tachogenerator for measuring the rotational speed of the wheel.

The reference value updating means may be adapted, if a difference between the maximum and the minimum of sensor outputs detected during a predetermined period is within a predetermined range when the sensor outputs are greater than a present reference value, to update the reference value by employing the maximum or minimum sensor output as a new reference value.

The reference value updating means may be adapted, if a difference between a present reference value and the maximum of sensor outputs detected during a predetermined period is not greater than a predetermined value when the sensor outputs are greater than the present reference value, to update the reference value by employing the maximum or minimum sensor output as a new reference value.

The reference value updating means may be adapted, if a difference between the maximum and the minimum of sensor outputs detected during a predetermined period is within a predetermined range and a difference between a present reference value and the maximum sensor output is not greater than a predetermined value when the sensor outputs are greater than the present reference value, to update the reference value by employing the maximum or minimum sensor output as a new reference value.

The present invention will hereinafter be described in detail by way of EMBODIMENTS 1 and 2 illustrated in the attached drawings. However, it should be noted that the invention is in no way limited to these embodiments.

EMBODIMENT 1

FIG. 1 is a full perspective view illustrating a motorized bicycle according to EMBODIMENT 1 of the present invention. Referring to FIG. 1, the motorized bicycle 1 having an electric motor 8 (which will be described later) is adapted to be driven by the driving force of man power with an assist of the driving force of the electric motor 8 by changing the driving force of the electric motor 8 depending on the torque of the man power.

A front wheel 2 and a rear wheel 3 are mounted to a main frame 4. The front wheel 2 is rotatably supported by a shaft. A hub casing 5 is fitted around a rotary shaft of the rear wheel 3. The hub casing 5 includes a rotative casing portion 6 and a stationary casing portion 7. The rotative casing portion 6 is rotated unitedly with the rear wheel 3. The electric motor 8 is incorporated in the hub casing 5. When electromotive driving is required, the electric motor 8 is driven and cooperates with a man-power driving section 10 (which will be described later) to rotate the rotative casing portion 6. The driving unit comprised of the hub casing 5 constitutes an electromotive driving section 9.

The man-power driving section 10 rotates the rear wheel 3 via a chain 12 when a user presses down pedals 11. In this embodiment, the chain 12 is employed as a transmission member. Alternatively, a belt, a rotary shaft or the like may be used.

The front wheel 2 is steered by handlebars 13. When right and left brake levers 15 and 14 are pulled, wires 16 and 17 are pulled by the brake levers 14 and 15 to actuate front and rear brake units 18 and 19. A brake switch 20 disposed intermediate the wires 16 and 17 serves to stop power supply to the electric motor 8 when the brake levers 14 and 15 are operated.

Reference numeral 21 denotes a saddle. A battery portion 22 for supplying power to the electric motor 8 includes a battery case 23 slidably detachable to the frame 4 and a single chargeable battery accommodated in the battery case 23. The supply voltage of the battery is about 24 V.

Figure 2:
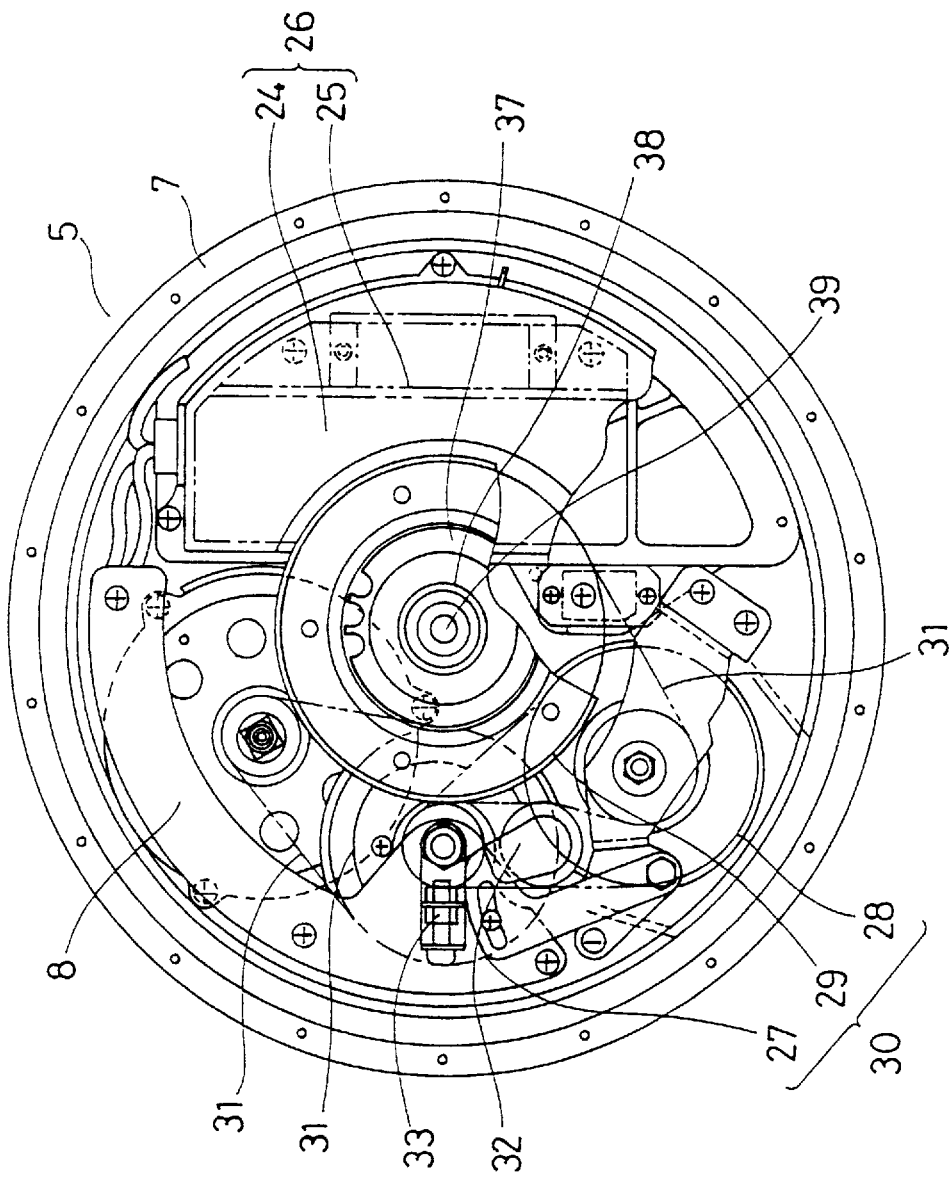
FIG. 2 is a front view illustrating the inside construction of a hub casing according to EMBODIMENT 1.

The hub casing 5 will be described with reference to FIG. 2, which is a front view illustrating the inside construction of the hub casing 5. The stationary casing portion 7 is fixed to the motorized bicycle 1. In the stationary casing portion 7 are disposed a control section 26 including a control substrate 24, a radiator plate 25 and the like, the electric motor 8, a deceleration mechanism 30 including three pulleys (first pulley 27, second pulley 28 and final-stage pulley 29), and transmission belts 31 connecting the pulleys in the deceleration mechanism 30.

The final-stage pulley 29 of the deceleration mechanism 30 is fixed to the rotary casing portion 6. The first, second and final-stage pulleys are rotated by the transmission belts 31 when the electric motor 8 is rotated, and serve to decelerate the rotation of the electric motor 8. The rotary casing portion 6 is rotated along with the final-stage pulley 29. A smaller-diameter pulley portion of the second pulley 28 connected to the final-stage pulley 29 is provided with a one-way clutch to prevent the electric motor 8 from being rotated by a driving force applied from the pedals. This allows the pedals 11 to be pressed down with a smaller force.

A pressure member 32 and an adjustment screw 33 are used to adjust the tension of transmission belts 31. An elongate opening is formed in a rotary-shaft mounting portion of the first pulley 27. For the adjustment of the tension of the transmission belts 31, the first pulley 27 is fixed by the adjustment screw 33 after the first pulley 27 is moved in such a direction that the transmission belts 31 are stretched.

A chain sprocket 37 transmits the driving force from the chain 12 to the rotary casing portion 6. Between the chain sprocket 37 and the rotary casing portion 6 is disposed a free wheel 38. The chain sprocket 37 prevents the driving force from the chain 12 from being transmitted to the rotary casing portion 6 when the chain 12 is rotated in a reverse direction. Reference numeral 39 denotes an axle of the rear wheel 3.

Figure 3:
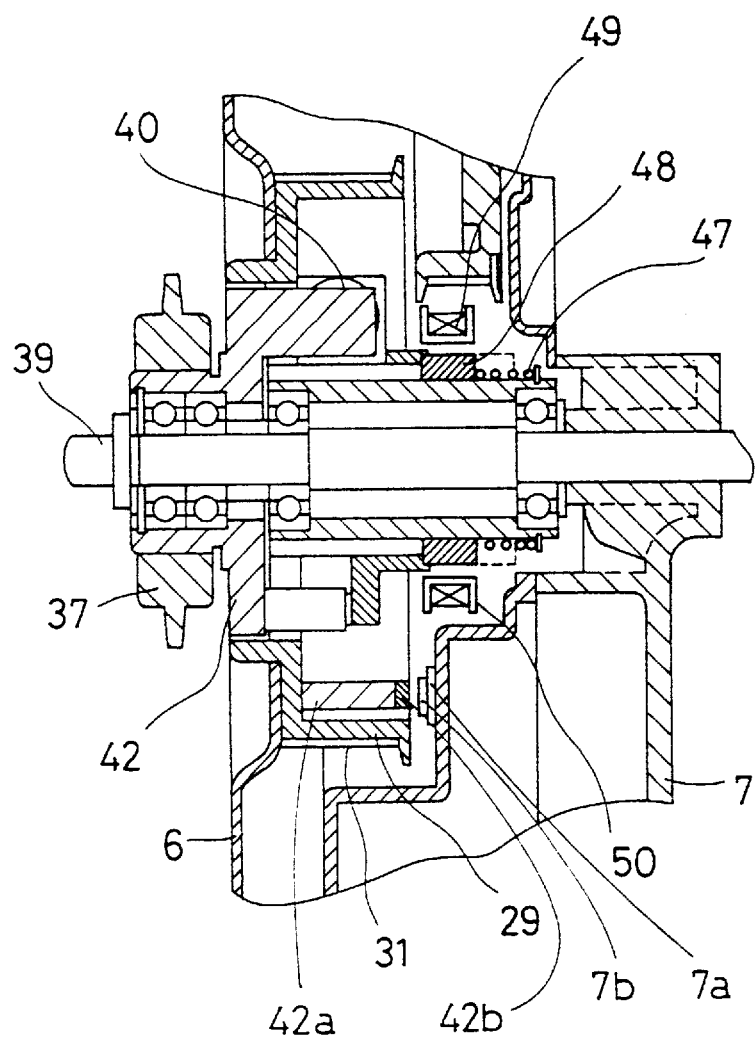
FIG. 3 is a vertical sectional view illustrating the construction of a final-stage pulley of the motorized bicycle according to EMBODIMENT 1.
Figure 4:
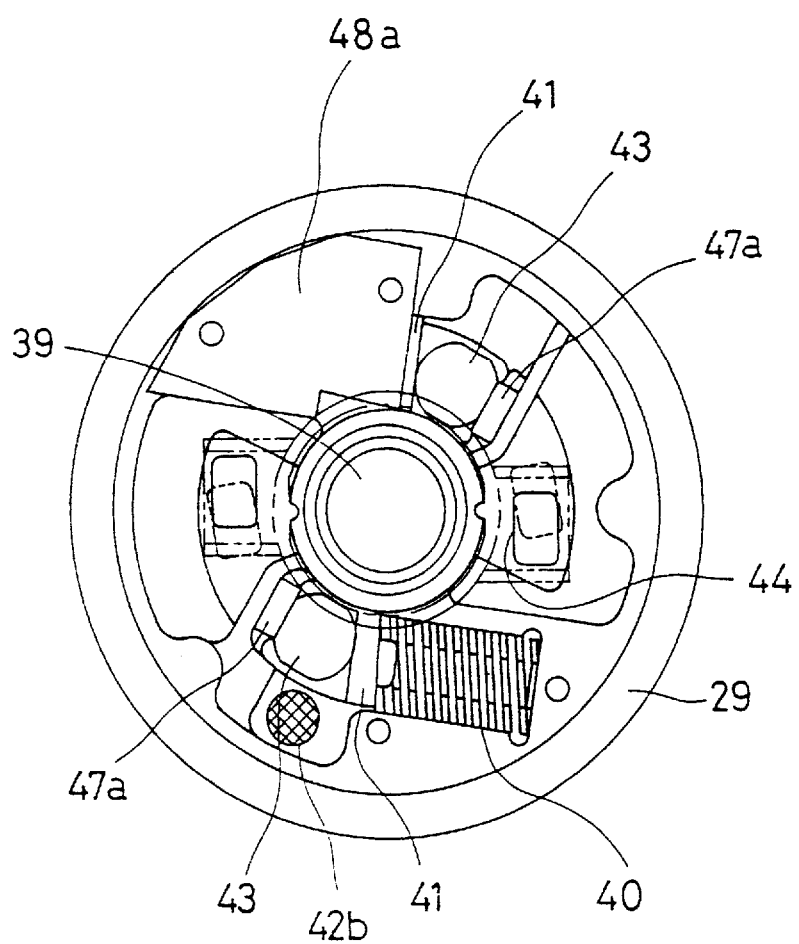
FIG. 4 is a plan view illustrating the construction of the final-stage pulley of the motorized bicycle according to EMBODIMENT 1.
Figure 5:
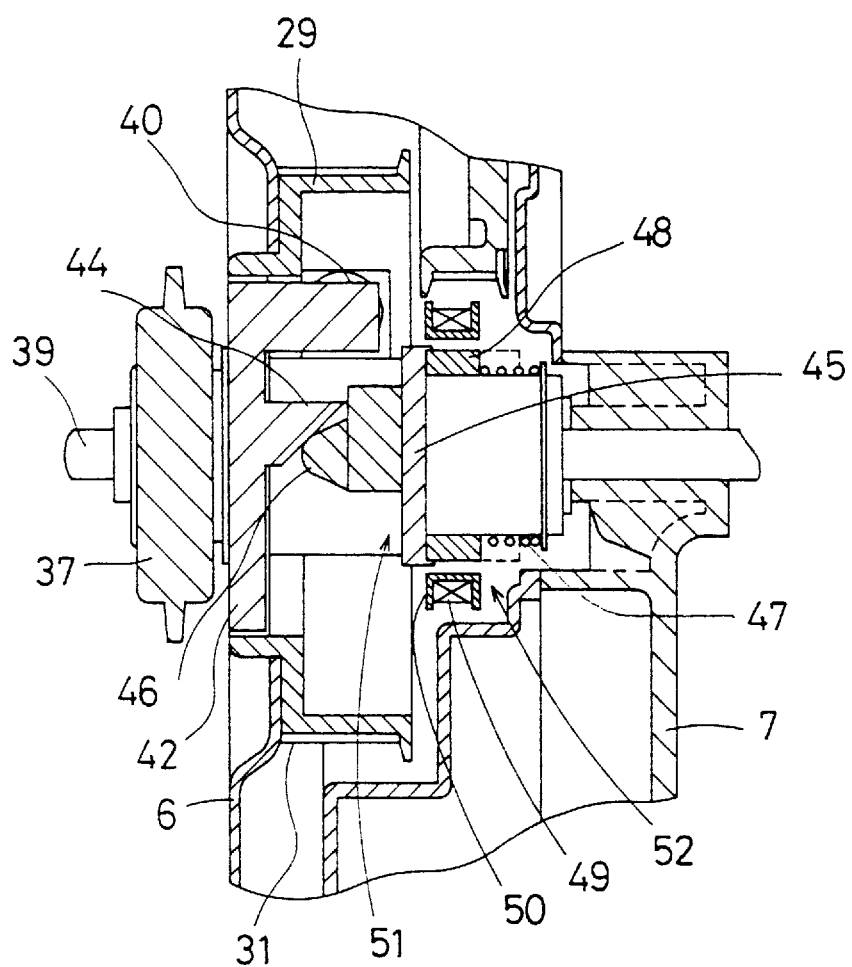
FIG. 5 is a vertical sectional view illustrating the construction of the final-stage pulley of the motorized bicycle according to EMBODIMENT 1.

With reference to FIGS. 3, 4 and 5, there will be explained the construction of the final-stage pulley 29.

As shown in FIGS. 3, 4 and 5, two resilient members or springs 40 are disposed symmetrically with respect to the axle 39 inside the final-stage pulley 29. One end of each of the springs 40 is fixed to the final-stage pulley 29 and the other end thereof is open for free stretching. The stretching direction of the respective springs 40 coincides with a tangent line of a circle concentric to the axle 39 or the final-stage pulley 29, so that the springs can easily receive force from pressure members 43 (which will be described later) when a pedaling force is applied to the pedals 11.

A pressure receiving member 41 abutting against the open end of each of the springs 40 has a small-diameter portion smaller in diameter than the spring 40 and a large-diameter portion larger in diameter than the spring 40. The small-diameter portion is fitted within the spring 40, and the large-diameter portion caps the spring 40. The pressure receiving portions 41 are made of a smooth material such as iron or a ceramic.

A rotary plate 42 fitted around the axle 39 is rotated by the rotation of the chain sprocket 37. The pressure members 43 are disposed on the rotary plate 42 symmetrically with respect to the axle 39 and adapted to press the pressure receiving members 41 when the chain sprocket 37 is rotated. The pressure members 43 are made of a smooth material such as iron or a ceramic.

The rotary plate 42 is fitted within the final-stage pulley 29 concentrically therewith, and adapted to be rotated along with the final-stage pulley 29 by the pressure members 43 pressing the springs 40. The pressure members 43 each have a spherical surface at one end portion thereof, as the pressure members 43 are slightly offset from their original positions when pressing the pressure receiving portions 41. The rotary plate 42 includes inclined portions 44 provided symmetrically with respect to the axle 39 and each inclined toward the rotational direction thereof. The inclined portions 44 are rotated along with the rotary plate 42.

A slide member 45 is movable toward the axle 39 by the action of the inclined portions 44 when the rotary plate 42 is rotated. The slide member 45 has projections 46 at portions thereof abutting against the inclined portions 44. A resilient member or a spring 47 is disposed on a side opposite to the projections 46 of the slide member 45 to bias the slide member 45 toward the rotary plate 42. More specifically, the slide member 45 is slided only when the rotary plate 42 is rotated to press the slide member 45. The slide member 45 returns to its original position when the rotary plate 42 returns to its original position. The slide member 45 is provided with a magnetic member 48, e.g., a ferrite 48 in this embodiment. The magnetic member 48 is movable along with the slide member 45.

A coil 49 is disposed within a movable range of the ferrite 48 in the stationary casing portion 7. The ferrite 48 is movable inside a coil bobbin 50 around which the wire of the coil 49 is wound.

The rotary plate 42 in the rotary casing portion 6 has a boss 42a provided with a magnet 42b for detecting the rotational speed of the rotary casing portion 6. A substrate 7a is disposed at a position of the stationary casing portion 7 facing opposite the magnet 42b, and is provided with a reed switch 7b.

The reed switch 7b is turned on (or turned off) by the magnetic force of the magnet 42b every time the magnet 42a approaches the reed switch 7b. The speed of the motorized bicycle is determined by counting the time from the switch-on (or switch-off) to the switch-off (or switch-on) of the reed switch 7b by means of a counter.

The aforesaid rotary plate 42 and the slide member 45 constitute a conversion member 51. The ferrite 48 of the slide member 45 and the coil 49 disposed in the stationary casing portion 7 constitute a torque detecting section 52. The magnet 42b and the reed switch 7b constitute a bicycle speed sensor.

An explanation will next be given to the man-power driving and the torque detection by the torque detecting section 52.

A user applies a pedaling force to the pedals 11 to start driving the motorized bicycle 1. At this time, a force keeping the rear wheel 3 still is large enough to permit the chain sprocket 37 and the rotary plate 42 to rotate and, therefore, the rotary plate 42 presses the springs 40. The springs 40 press the final-stage pulley 29, so that the rotary casing portion 6 to which the final-stage pulley 29 is fixed is rotated along with the rear wheel 3. Since a large torque is generated during the traveling of the motorized bicycle, the springs 40 are greatly compressed. That is, the rotary plate 42 and the inclined portions 44 are rotated with the springs 40 being compressed.

When the inclined portions 44 are rotated, the projections 46 abutting thereagainst are pressed toward the axle 39, and the slide member 45 is moved toward the axle 39. When the slide member 45 is moved toward the axle 39, the ferrite 48 is moved inside the coil 49, thereby changing the inductance of the coil 49.

More specifically, as the pedaling force becomes greater, the volume of a portion of the ferrite 48 inserted into the coil 49 becomes larger, thereby increasing the inductance of the coil 49. The voltage applied to the coil 49 is changed by the inductance change. The greater the inductance, the smaller the voltage. The smaller the inductance, the greater the voltage. Therefore, the magnitude of the pedaling force can be determined by detecting the change in the voltage. The electric motor 8 is controlled to be driven depending on the magnitude of the pedaling force.

Where the user applies no pedaling force to the pedals 11 when the motorized bicycle travels on a level road, the rotary plate 42 is rotated along with the final-stage pulley 29. Since no pedaling force is applied in this sate, the springs 40 are not compressed, and the slide member 45 is not moved. That is, neither the inductance of the coil 49 nor the voltage applied to the coil 49 change and, hence, no driving force is applied from the electric motor 8.

Where the user accelerates the motorized bicycle when the bicycle travels uphill or on a level road, the bicycle operates in the same manner as in the case where the driving of the bicycle is started. More specifically, when the pedaling force is applied, the springs 40 are compressed and the rotary plate 42 is rotated depending on the magnitude of the torque of man power. Then, the projection 46 abutting against the inclined portions 44 are pressed by the rotated inclined portions 44 to move the slide member 45, whereby the ferrite 48 is inserted into the coil 49.

Reference numeral 47a denotes rubber plates for protecting the pressure members 43 urged by the springs 40 from a shock. Reference numeral 48a denotes covers capping the springs 40.

Figure 6:
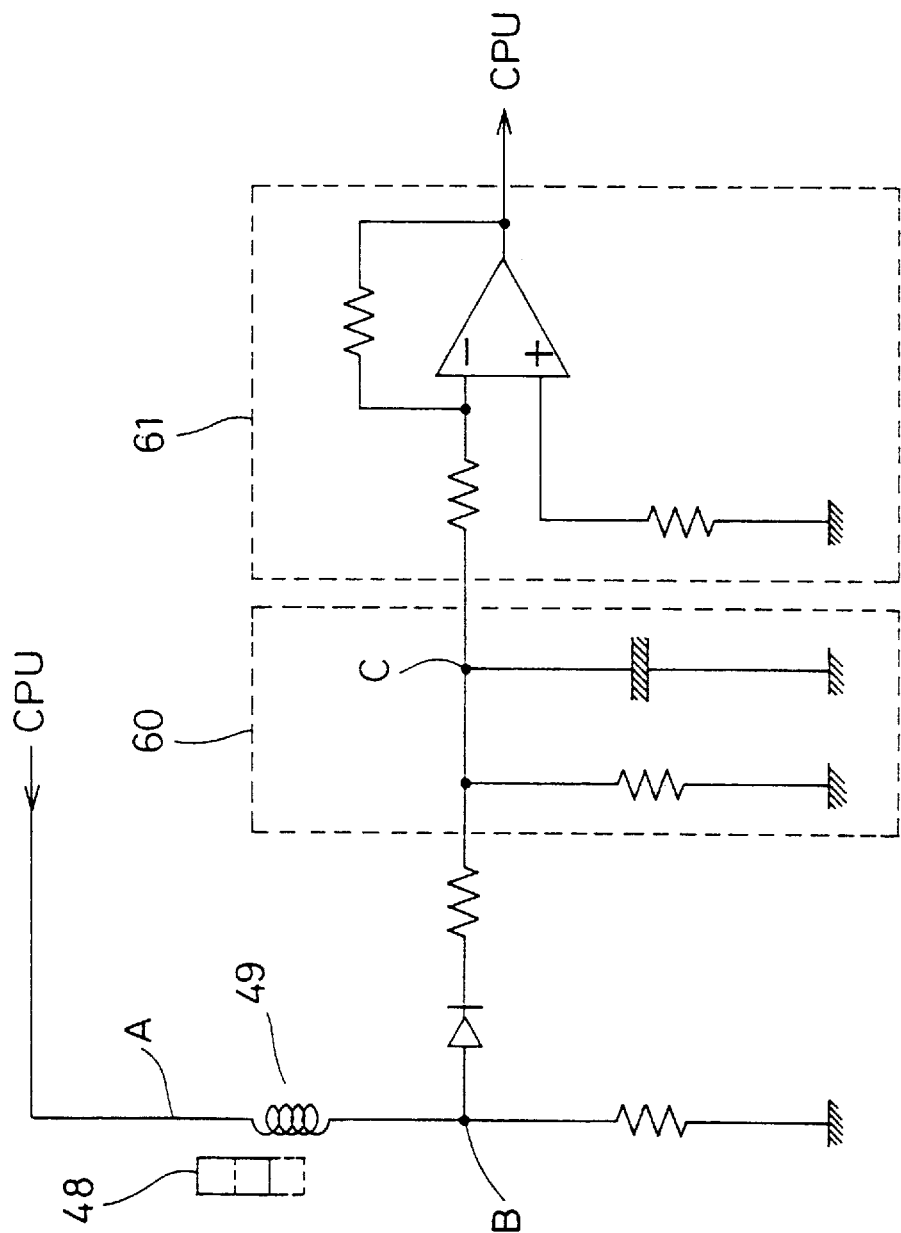
FIG. 6 is a circuit diagram of a torque detecting section of the motorized bicycle according to EMBODIMENT 1.

A circuit of the torque detecting section 52 will next be described with reference to FIGS. 6 and 7.

Figure 7A:
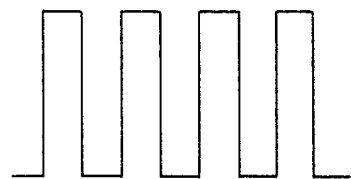
FIGS. 7A, 7B and 7C are diagrams for explaining waveforms of signals outputted from respective portions of the circuit in the torque detecting section of the motorized bicycle according to EMBODIMENT 1.
Figure 7B:
Figure 7C:
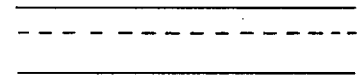

An AC voltage outputted from a CPU (not shown) is applied to the coil 49. The AC voltage to be inputted has a waveform as shown in FIG. 7A. The inductance of the coil 49 is increased or decreased by moving the ferrite 48 toward or away from the coil 49 and the voltage outputted from the coil 49 has a waveform as shown in FIG. 7B. The outputted pulse signal is transformed into a DC signal by a DC transforming section 60 by averaging the pulses. That is, the pulse signal is transformed into the DC signal having a waveform as shown in FIG. 7C, then amplified by an amplifier 61, and A/D converted by an A/D convertor (not shown) to be inputted into the CPU.

The waveform of a signal shown by a dotted line in FIG. 7B corresponds to a case where the ferrite 48 approaches the coil 49. In this case, the signal is transformed into a DC signal having a lower level than in the aforesaid case as shown in FIG. 7C by the DC transforming section 60, and then inputted into the CPU.

Thus, the pedaling force is converted into the movement of the ferrite 48 along the axle 39, which influences the inductance of the coil 49. The change in the inductance of the coil 49 is converted into a change in the voltage, which is taken out as an electrical signal. Therefore, exact and minute detection of the torque can be realized, thereby allowing for accurate control for the assist of the man power.

The ferrite 48 is adapted to be moved within the coil 49 in accordance with this embodiment. Alternatively, the ferrite may be adapted to approach the coil by moving the slide member 45, i.e., the ferrite may be disposed adjacent the coil, as the inductance of the coil is changed only by moving the ferrite toward the coil.

The detection of the torque may be achieved by employing only the resilient member 47 without the use of the springs 40. In this case, the slide member 45 presses the resilient member 47 when the pedaling force is applied, and the slide member 45 is returned to its original position by the resilient force of the resilient member 47 when the pedaling force is no longer applied.

Figure 8:
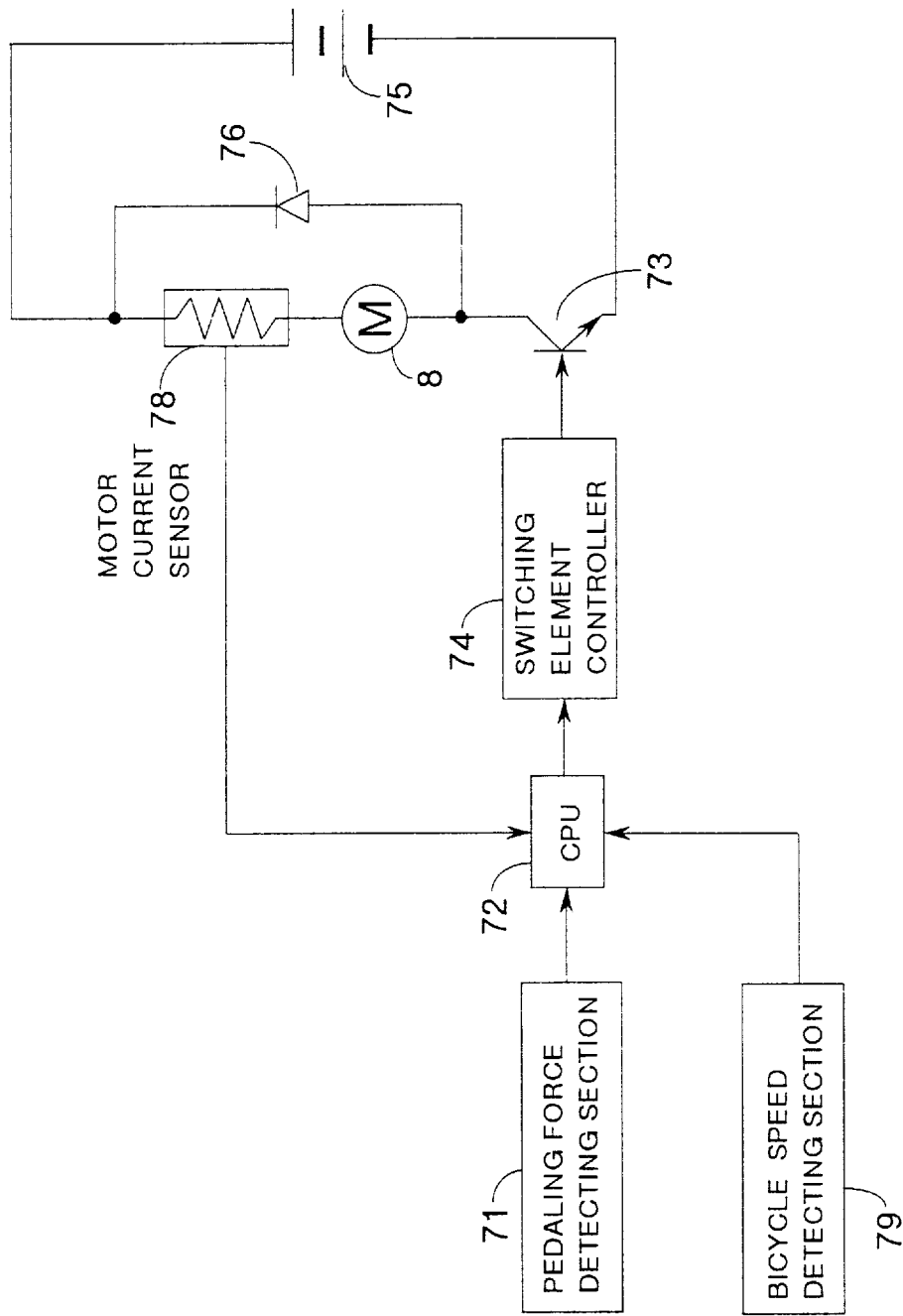
FIG. 8 is a block diagram illustrating a control circuit of an electric motor according to EMBODIMENT 1.
Figure 9:
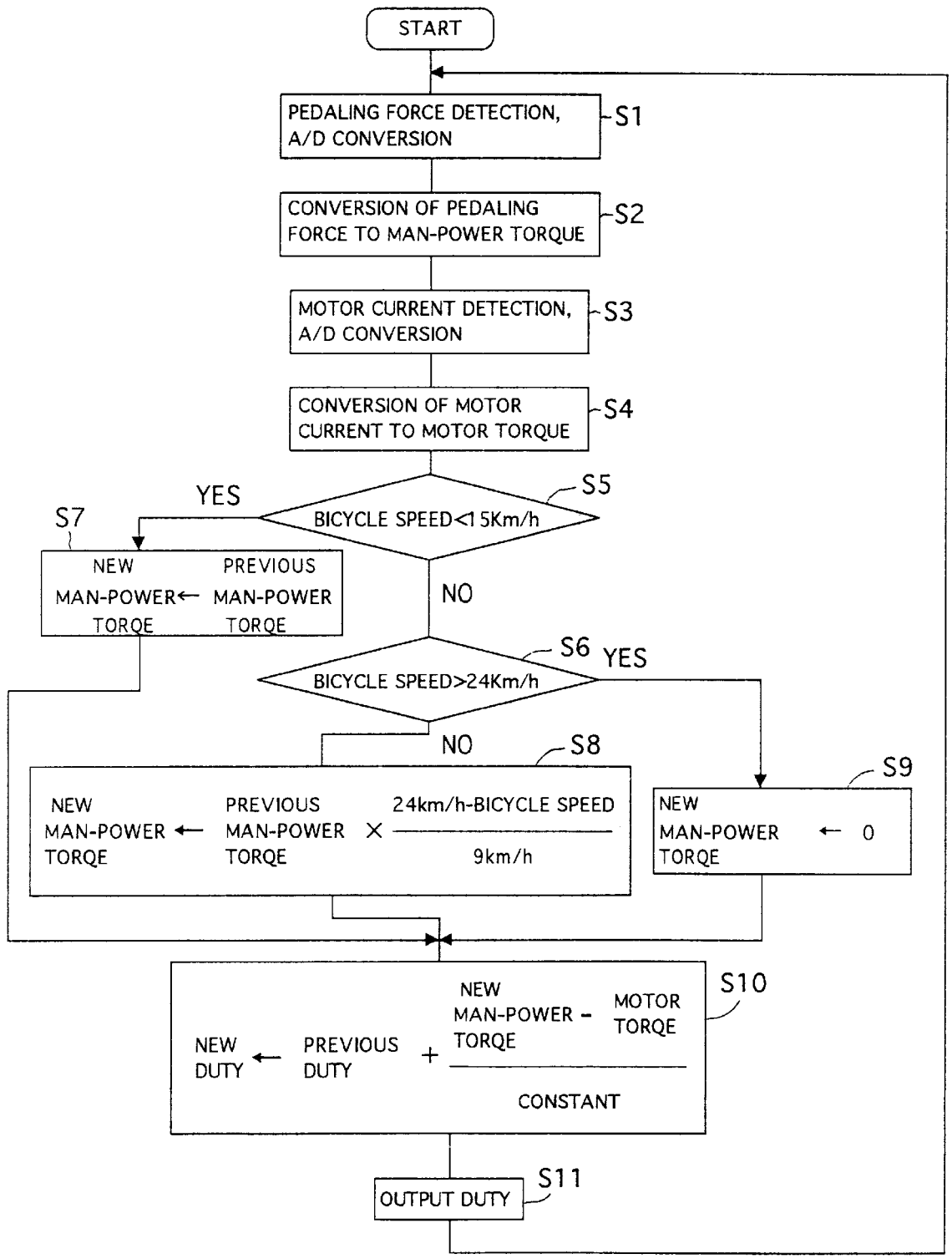
FIG. 9 is a flow chart for illustrating the operation of a CPU according to EMBODIMENT 1.

FIG. 8 is a block diagram illustrating a control circuit of the motorized bicycle.

Referring to FIG. 8, the control circuit includes a pedaling force detecting section 71 comprised of the torque detecting section 52, a bicycle speed detecting section 79 comprised of the bicycle speed sensor, a CPU 72, a switching element 73 for switching the circuit, a switching element controller 74 for controlling the switching element 73 for duty control (PWM control) of power supply, and a DC supply 75. Used as the DC supply 75 is a 24-V, 2.5-Ah nickel-cadmium (Ni—Cd) battery.

The control circuit further includes a fly-wheel diode 76, a supply voltage detector 77, and a motor current sensor 78 for detecting a current flowing through the electric motor 8.

The motor current sensor 78 has two resistors (shunt resistors) connected in parallel and each having a resistance of 4.5 mn and an allowable current of 14 A. A voltage drop is detected by a differential amplifier, and the value of the detected voltage drop is A/D converted to be inputted into the CPU 72. The CPU 72 calculates the torque of the electric motor 8 on the basis of the value of a current outputted from the motor current sensor 78.

The operation of the CPU 72 will be described with reference to a flow chart shown in FIG. 10.

In the CPU 72, the pedaling force is detected by the pedaling force detecting section 71, and A/D (analog-digital) converted (Step S1). Then, the pedaling force is converted into a man-power torque (Step S2). The current of the electric motor 8 (i.e., motor current) is detected and A/D converted (Step S3), and then converted into a motor torque (Step S4).

In turn, it is judged whether the speed of the bicycle obtained from the bicycle speed detecting section 79 is lower than 15 Km/h (Step S5) or not lower than 24 Km/h (step S6). If the speed is lower than 15 Km/h, a previous torque input is employed as a new torque input (Step S7). On the other hand, if the speed is within a range between 15 Km/h and 24 Km/h, a value obtained by multiplying the previous torque input by (24-speed)/9 (Km/h) is employed as a new torque input (Step S8). If the speed is not lower than 24 Km/h, "0" is employed as a new torque input.

A value {previous duty+(new torque input−motor torque) /constant} is calculated, i.e., by integral calculus, to be employed as a new duty (Step S10). Then, the new duty is outputted (Step S11).

Figure 10:
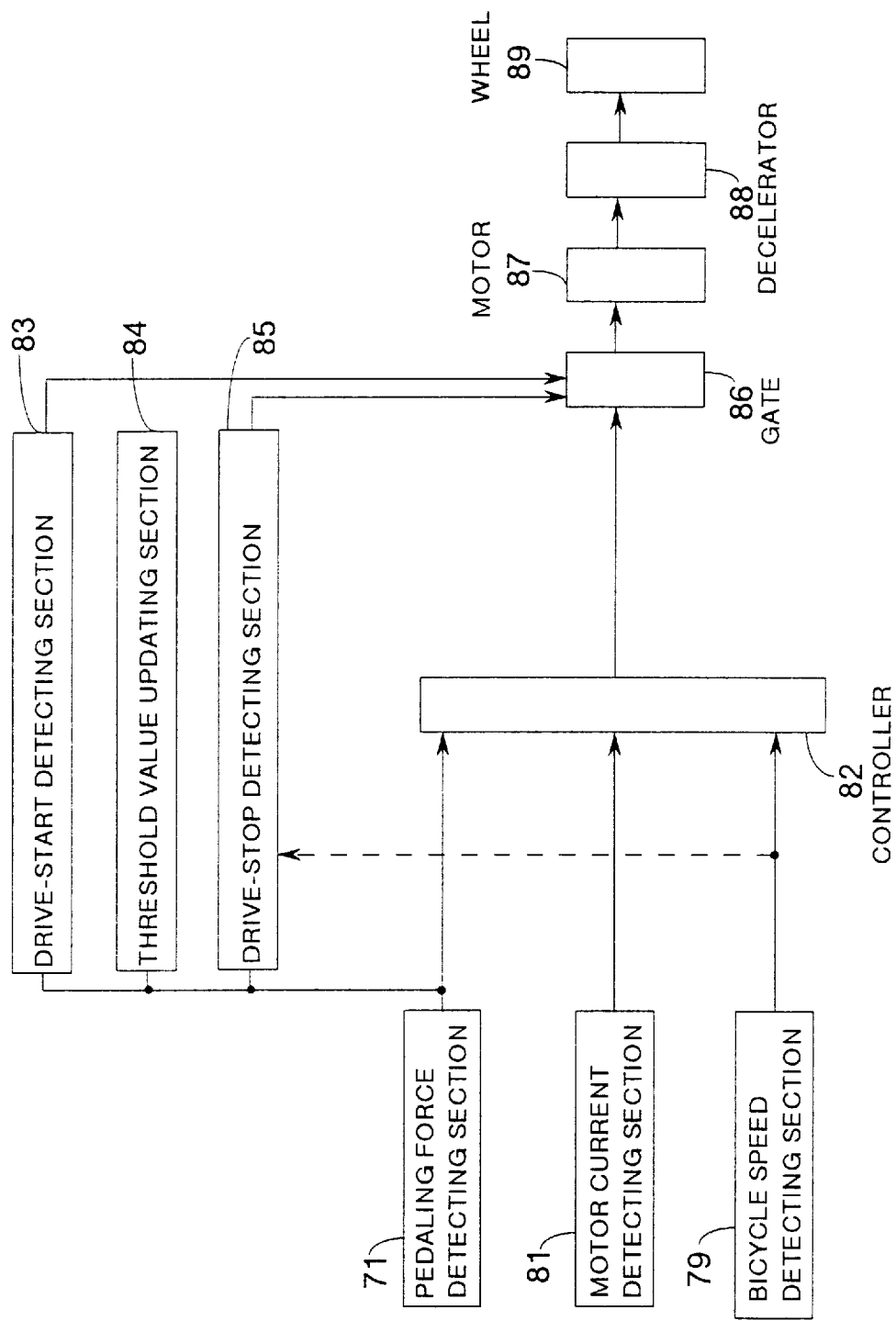
FIG. 10 is a block diagram illustrating a circuit for starting or stopping the driving of the electric motor according to EMBODIMENT 1.

FIG. 10 is a block diagram illustrating a circuit for starting or stopping the driving of the electric motor.

Referring to FIG. 10, the circuit includes a motor current detecting section 81 comprised of the motor current sensor 78, and a controller 82 comprised of the CPU 72. The circuit further includes a drive-start detecting section 83, a threshold value updating section 84 and a drivestop detecting section 85, which are all incorporated in the CPU 72, and a gate 86 comprised of the switching element. In this embodiment, the switching element 73 for the duty control of the power supply is used in common as the gate 86. Alternatively, another switching element for turning on and off the power supply may be connected in series with the switching element 73.

Reference numerals 87, 88 and 89 are a motor comprised of the electric motor 8, a decelerator comprised of the deceleration mechanism 30 disposed in the hub casing 5, and a wheel comprised of the rear wheel 3, respectively.

The operation according to this embodiment will be described with reference to flow charts shown in FIGS. 11 to 14.

Figure 11:
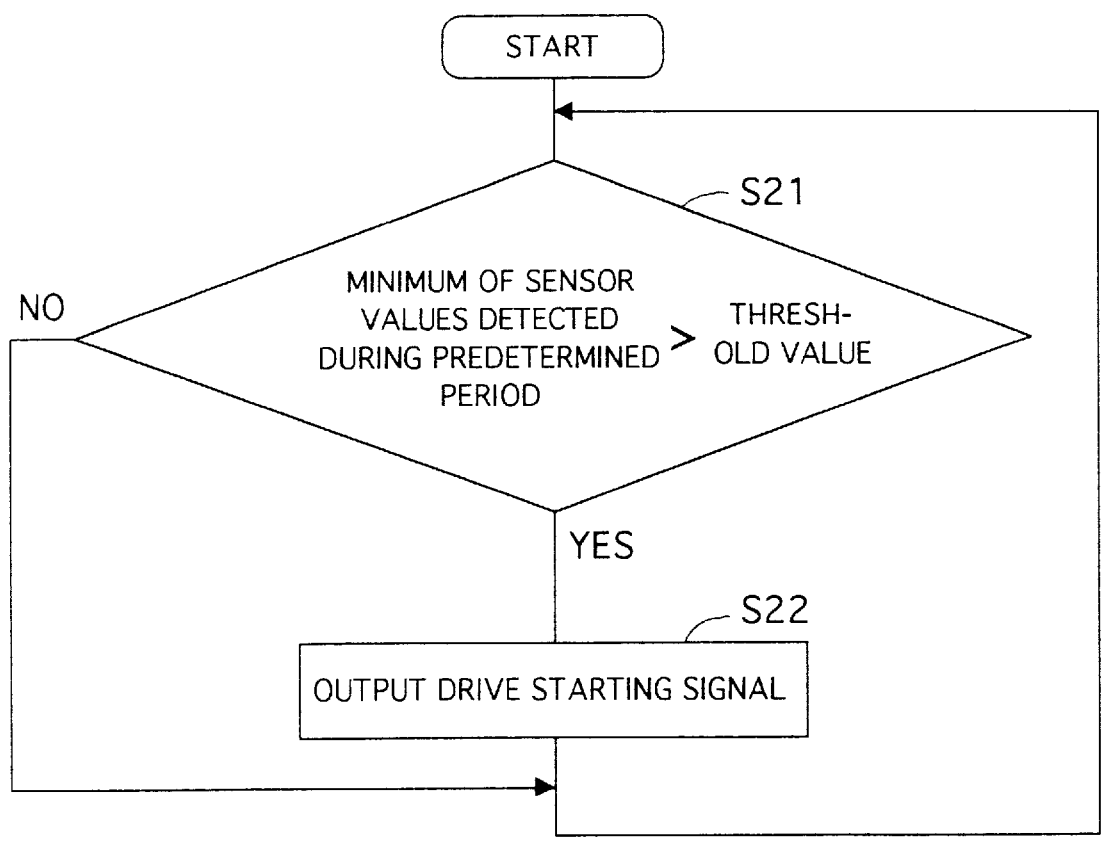
FIG. 11 is a flow chart for illustrating a process for starting the driving of the electric motor according to EMBODIMENT 1.

FIG. 11 is a flow chart for illustrating a process for starting the driving of the motor. This process is performed in the drive-start detecting section 83.

In this process, it is first judged whether or not the value (sensor value) of the pedaling force obtained from the pedaling force detecting section 71 is greater than a threshold value preliminarily stored in a memory. This is achieved by comparing the minimum of sensor values obtained during a predetermined period (30 msec) with the threshold value (Step S21). An erroneous operation due to a noise can be prevented by employing the minimum of the sensor values obtained during the 30 msec period. If the minimum sensor value is not less than the threshold value, a motor drive starting signal is outputted (Step S22).

Figure 12:
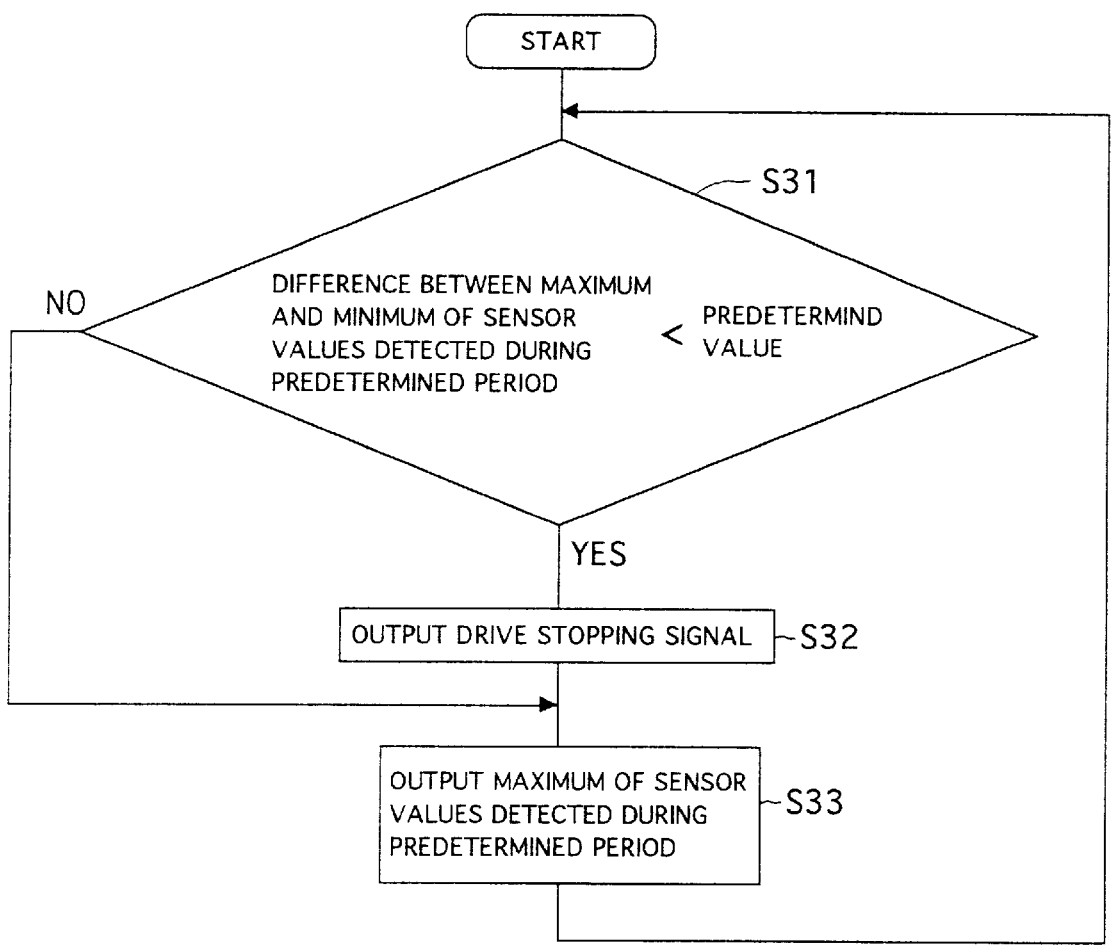
FIG. 12 is a flow chart for illustrating a process for stopping the driving of the electric motor according to EMBODIMENT 1.

FIG. 12 is a flow chart for illustrating a process for stopping the driving of the motor 87. This process is performed in the drive-stop detecting section 85.

In this process, the fluctuation range of the values (sensor values) of the pedaling force obtained from the pedaling force detecting section 71 is detected, and the detected fluctuation range is compared with a predetermined range value preliminarily stored in a memory. A difference between the maximum and the minimum of sensor values obtained during a predetermined period (4 sec) is determined, and the difference is compared with the predetermined range value (Step S31).

The observation period is set to four seconds, because the pedaling cycle is typically about four seconds. Stored as the predetermined range value may be a difference between the maximum and the minimum of values of a pedaling force observed when the motorized bicycle is pedaled with the least pedaling force.

If the comparison in Step S31 indicates that the difference between the maximum and the minimum of the sensor values obtained during the 4 sec period is less than the predetermined value, a motor drive stopping signal is outputted (Step S32). on the other hand, if the difference is not less than the predetermined value, it is considered that the bicycle is pedaled, and the maximum of the sensor values obtained during the predetermined period (4 sec) is outputted (Step S33). The maximum sensor value is inputted to the threshold updating section 84.

Figure 13:
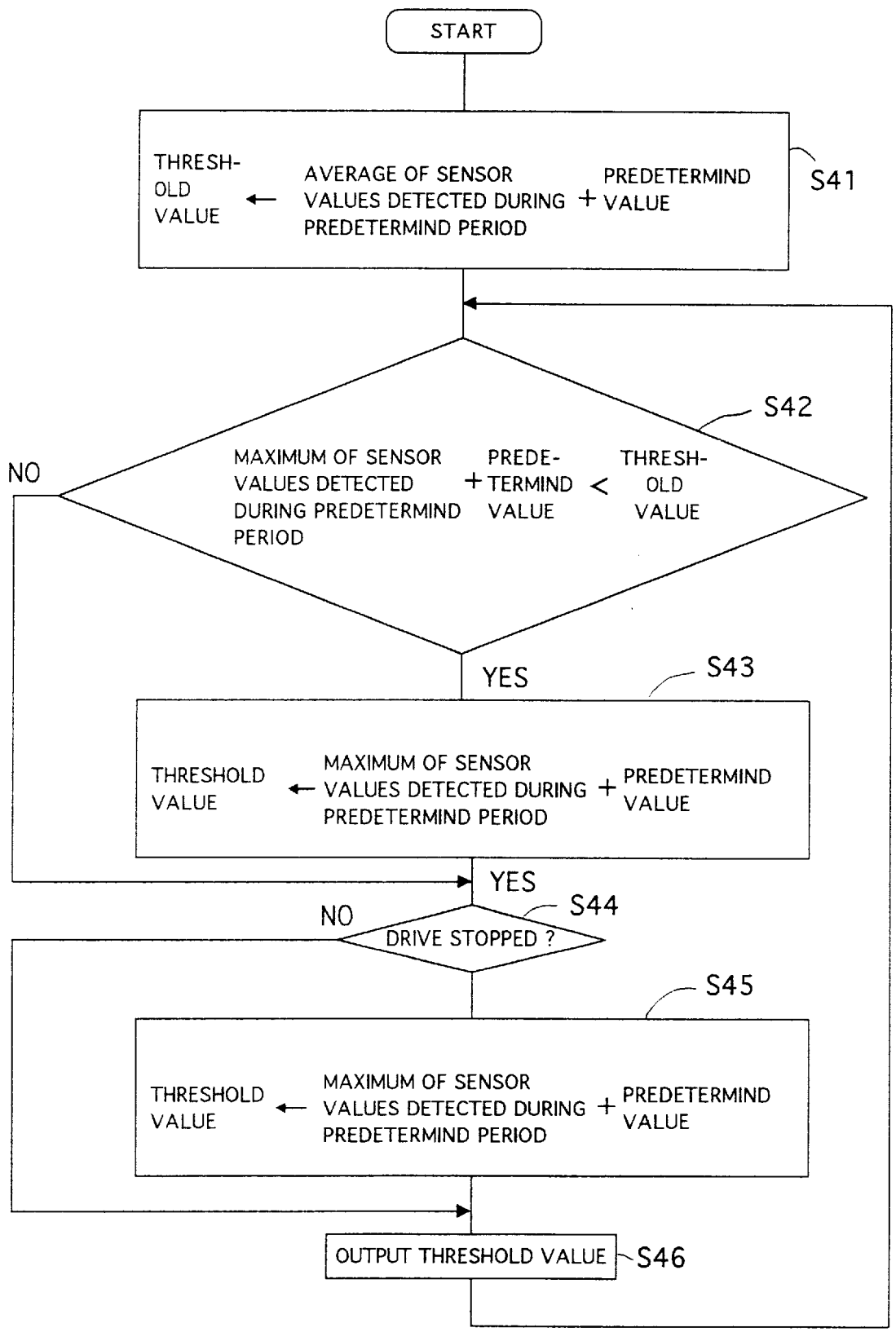
FIG. 13 is a flow chart for illustrating a process for updating a threshold value according to EMBODIMENT 1.

FIG. 13 is a flow chart for illustrating a process for updating the threshold value. This process is performed in the threshold value updating section 84.

In this process, the values (sensor values) of the pedaling force obtained from the pedaling force detecting section 71 during a predetermined period (30 msec) are averaged, and a sum of a predetermined value (5 Kg) and the average is stored as the threshold value in a memory (Step S41). The predetermined value is set to 5 kg for detecting an increase of 5 Kg in the pedaling force. This allows for easy discrimination of an actual increase in the pedaling force from an increase due to a noise.

Then, it is judged whether or not a sum of the predetermined value (5 Kg) and the maximum of sensor values obtained during a predetermined period (30 msec) is less than the threshold value (Step S42). An erroneous operation due to a noise can be prevented by setting the aforesaid two predetermined time periods to 30 msec.

If the sum of 5 kg and the maximum of the sensor values obtained during the 30 msec period is less than the threshold value, the sum is stored as a new threshold value in the memory (Step S43), thereby lowering the threshold value for the updating thereof.

If the drive stopping signal is outputted from the drivestop detecting section 85 (step S44), a sum of a predetermined value (5 Kg) and the maximum of sensor values obtained during a predetermined period (4 sec) is stored as a new threshold value in the memory for the updating of the threshold value (Step S45). At this time, the maximum sensor value in the predetermined period (4 sec) is obtained from the drive-stop detecting section 85.

If the drive stopping signal is not outputted in Step S44, the threshold value is outputted (Step S46). The threshold value is inputted into the drive-start detecting section 83.

Figure 14:
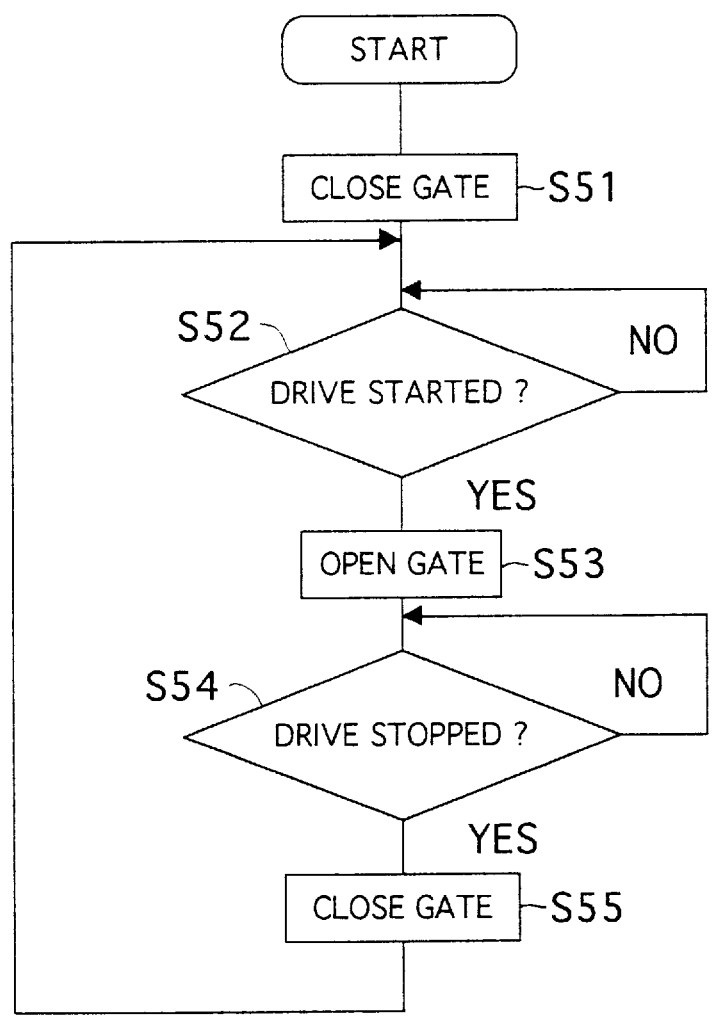
FIG. 14 is a flow chart for illustrating a process for opening and closing a gate according to EMBODIMENT 1.

FIG. 14 is a flow chart for illustrating a process for opening and closing the gate 86.

In this process, the gate is first closed (Step S51). If the drive starting signal is outputted from the drive-start detecting section 83, the gate is opened (Step S53). If the drive stopping signal is outputted from the drive-stop detecting section 85, the gate is closed (step S55).

Figure 15:
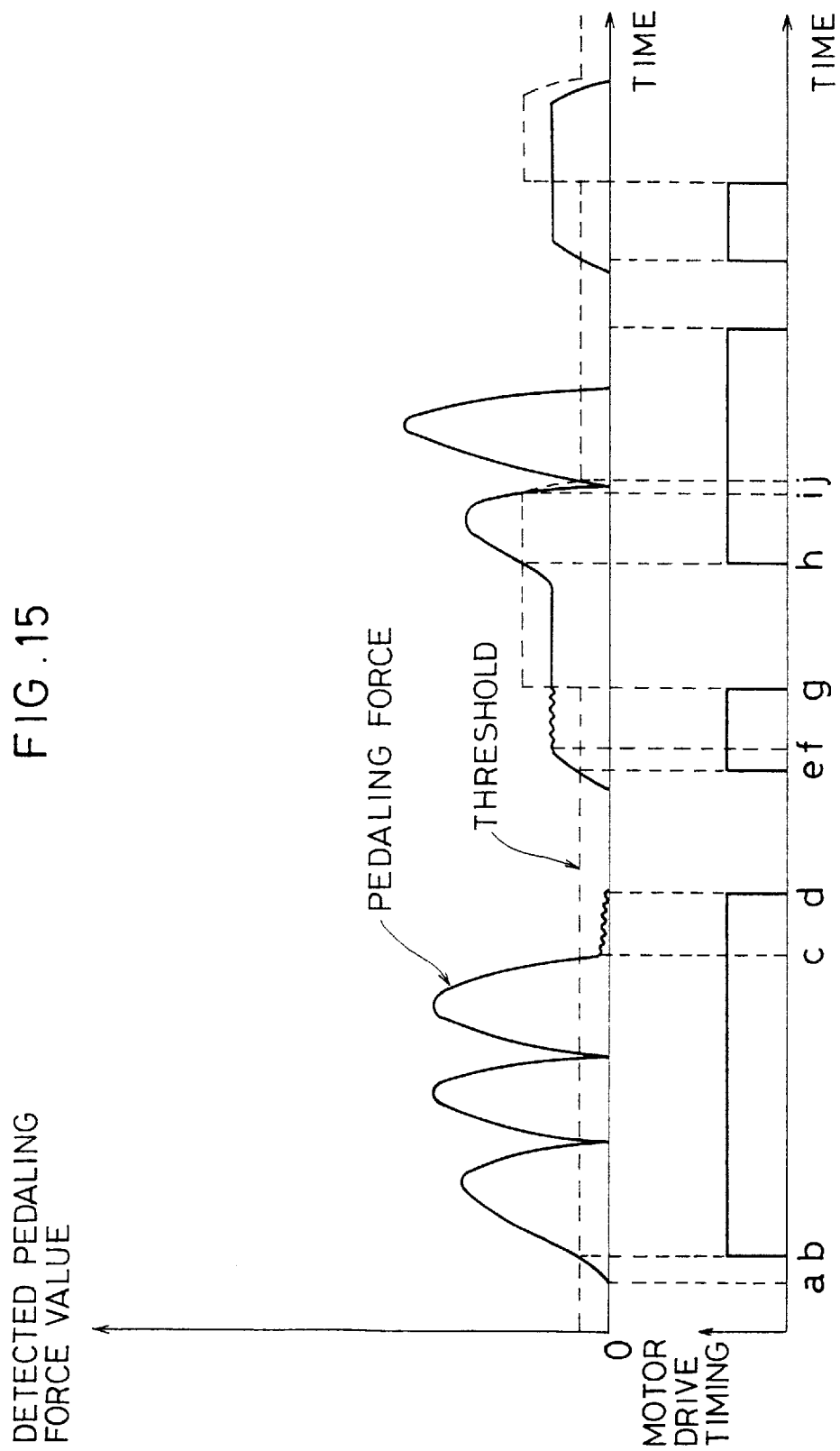
FIG. 15 is a graphical representation for illustrating the timing of motor driving and the updating of the threshold value according to EMBODIMENT 1.

FIG. 15 is a graphical representation for illustrating the timing of motor driving and the updating of the threshold value.

An explanation will be given from the left side of FIG. 15. The pedaling force starts increasing at a time a. Since the detected pedaling force does not exceed the threshold value at this time, the driving of the motor 87 is not started yet. The pedaling force exceeds the threshold value at a time b, so that the driving of the motor 87 is started. The pedaling force changes as shown by inverted-U-shaped curves in FIG. 15.

At a time c, the pedaling force becomes zero. After the pedaling force fluctuates within a small range (or is kept generally constant around zero) for a certain period, the driving of the motor 87 is stopped at a time d. During a period from the time c to the time d, the motor 87 is controlled on the basis of a detected pedaling force value of zero.

The driving of the motor 87 is once started at a time e. However, the driving is stopped at a time g because the pedaling force is kept generally constant from a time f to the time g, for example, in a state that the user places his foot on a pedal. At this time, the threshold value is updated.

Although a pedaling force is applied after the time g, the updated threshold value is greater than the applied pedaling force. Therefore, the driving of the motor 87 is not started. At a time h when a pedaling force greater than the updated threshold value is applied, the driving of the motor 87 is started.

From a time i to a time j, a value of (the present pedaling force+the predetermined value) is smaller than the present threshold value. Therefore, the threshold value is successively updated to be lowered. At the time j, the threshold value returns to the initial level.

Thus, the motorized bicycle can be driven under more stable conditions, and wasteful power consumption thereof can be prevented by performing the processes for starting and stopping the driving of the motor 87 and updating the threshold value.

In accordance with this embodiment, the fluctuation range detecting means detects the range of fluctuation in a pedaling force detected by the man-power sensor, and the operation stopping means compares the detected fluctuation range with a predetermined range value. If the fluctuation range is kept smaller than the predetermined range value for more than a predetermined time period, the operation of the electromotive driving means is stopped.

Where a threshold value is set for the pedaling force, for example, the driving of the motor is not stopped even if the pedaling force becomes lower than the threshold value after the pedaling force once exceeds the threshold value and the driving of the motor is started. When the fluctuation range of the pedaling force is kept smaller than the predetermined range value for a predetermined time period, the driving of the motor is stopped. Therefore, even if the motorized bicycle is driven with a pedaling force smaller than the threshold value, the driving with an assist by the motor can be continued. In addition, even if the pedaling force is no longer applied, unstable motor driving and stopping operation can be prevented. Further, even if a pedaling force greater than the threshold value is applied to the pedals when the bicycle is stopped, the driving of the motor can be stopped.

Where the motorized bicycle has the bicycle speed sensor and is adapted to stop the operation of the electromotive driving means only when the pedaling force does not fluctuate and no output is applied from the bicycle speed sensor, the electromotive driving means can be more reliably controlled. This is because the operation of the electromotive driving means is stopped only when the bicycle is not pedaled and is completely stopped.

In accordance with this embodiment, the threshold value comparing means compares the driving force detected by the man-power sensor with the threshold value and, if the driving force detected by the man-power sensor is greater than the threshold value, the operation starting means starts the operation of the electromotive driving means.

After the driving force exceeds the threshold value and the operation of the electromotive driving means is started, the range of fluctuation in the driving force detected by the man-power sensor is constantly detected by the fluctuation range detecting means. If the detected fluctuation range is kept smaller than the predetermined range value for more than the predetermined time period, the threshold value updating means updates the threshold value stored in the threshold value comparing means by employing a sum of a predetermined value and the driving force detected by the man-power sensor as a new threshold value.

In the prior art, where a user stops the motorized bicycle with his foot on a pedal and the brake thereof being applied, for example, a pedaling force is detected and, if the pedaling force is greater than the threshold value, the motorized bicycle is driven by the electromotive driving means though the bicycle is stopped.

In this case, however, the bicycle is not pedaled, but the user only places his foot on the pedal. Since the pedaling force is not changed and the fluctuation range of the pedaling force is kept smaller than the predetermined range for more than the predetermined time period, the driving of the electromotive driving means is once stopped. However, the operation of the electromotive driving means is started again because the pedaling force exceeds the threshold value in this operation stopped state. That is, the operation of the electromotive driving means is repeatedly stopped and started. Consequently, the electromotive driving means is intermittently driven as long as the user places his foot on the pedal, resulting in wasteful power consumption.

In this embodiment, if the fluctuation range of the pedaling force is kept smaller than the predetermined range value for more than the predetermined time period and the operation of the electromotive driving means is stopped, the threshold value stored in the threshold value comparing means is updated by employing as a new threshold value a sum of the predetermined value and the driving force detected by the manpower sensor (e.g., a sum of the predetermined value and a pedaling force detected when the motor driving is stopped) when the electromotive driving means is stopped. Thus, the electromotive driving means is prevented from being intermittently driven.

Where the motorized bicycle further includes the threshold value lowering means, the threshold value stored in the threshold value comparing means is compared with the sum of the predetermined value and the driving force detected by the man-power sensor and, if the sum is smaller than the threshold value, the threshold value is updated to be lowered by employing the sum as a new threshold value.

Therefore, the threshold value once updated to a higher level can be updated again to a lower level.

In the prior art, where the threshold value is updated to a higher level when the user stops the motorized bicycle with his foot being placed on the pedal and the brake thereof being applied, the electromotive driving cannot be started even if the user pedals the bicycle in a usual manner. This is because the threshold value is kept higher.

In this embodiment, if the sum of the present pedaling force and the predetermined value is smaller than the present threshold value, the threshold value is updated to be lowered by employing the sum as a new threshold value in order to prevent the aforesaid problem associated with the prior art.

EMBODIMENT 2

Figure 16:
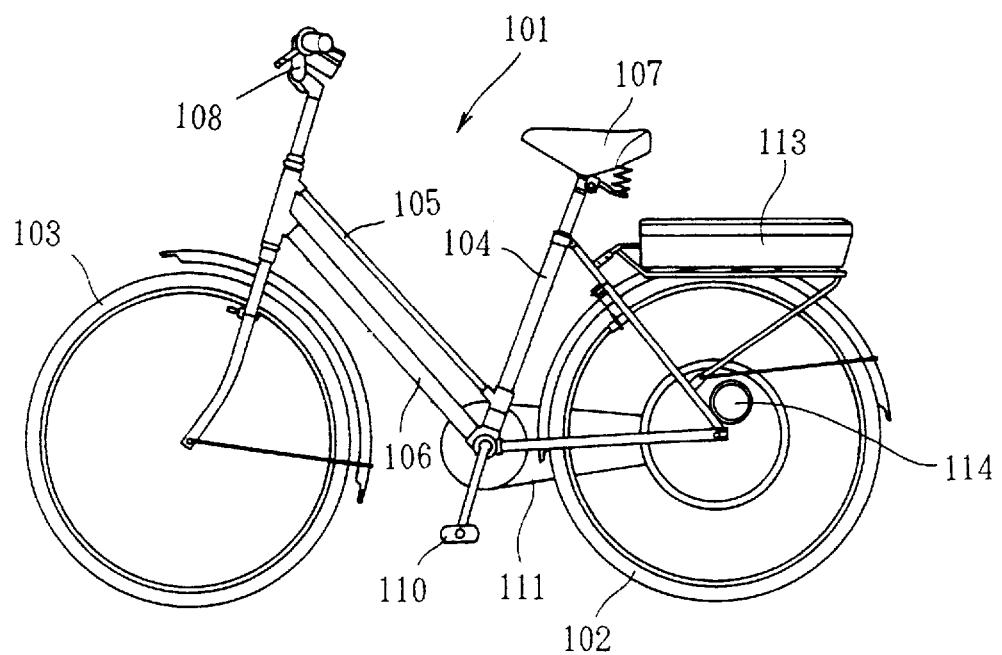
FIG. 16 is a side view illustrating a motorized bicycle according to EMBODIMENT 2 of the present invention.
Figure 17:
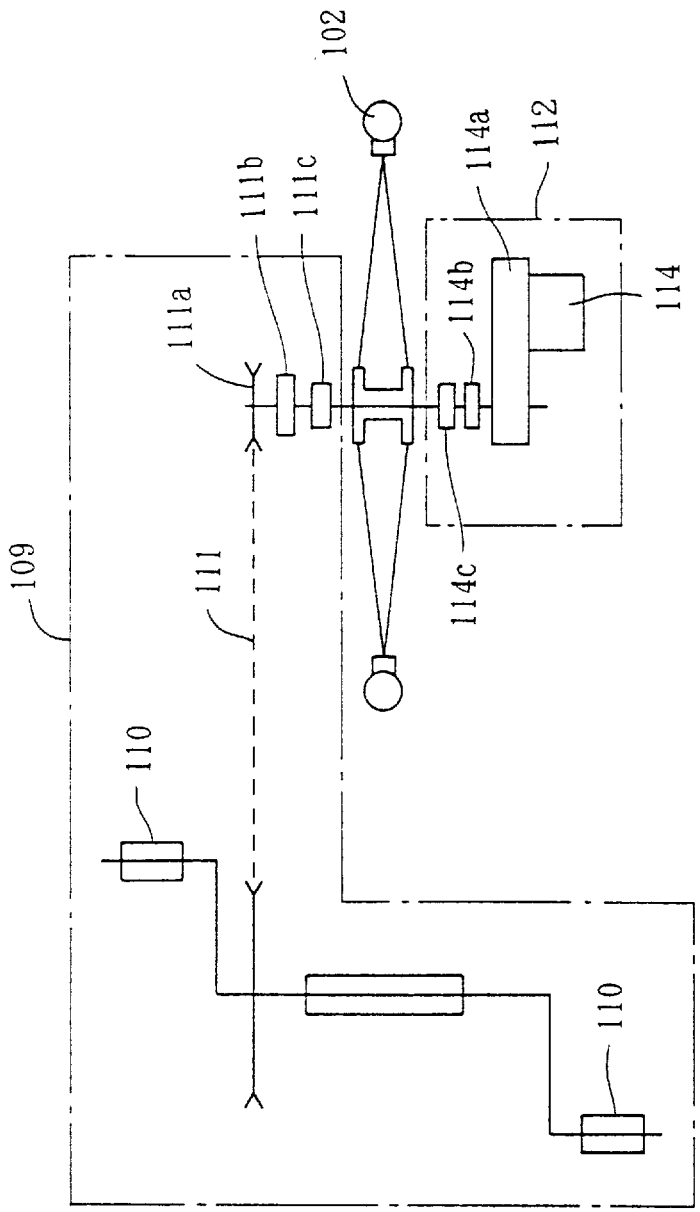
FIG. 17 is a diagram illustrating the construction of a driving system of the motorized bicycle according to EMBODIMENT 2.

FIG. 16 is a side view illustrating a motorized bicycle according to EMBODIMENT 2 of the present invention, and FIG. 17 is a diagram illustrating the construction of a driving system of the motorized bicycle.

Referring to FIG. 16, the motorized bicycle 101 includes a drive wheel 102 driven by man-power driving means 109 and electromotive driving means 112, and a front wheel 103 for determining the traveling direction of the bicycle. The motorized bicycle 101 further includes a frame including a seat pipe 104, an upper pipe 105 and a lower pipe 106, and a saddle 107 mounted on an upper end of the seat pipe 104. Handlebars 108 for controlling the orientation of the front wheel 103 is provided above a connection of the upper pipe 105 and the lower pipe 106.

The man-power driving means 109 for driving the drive wheel 102 has pedals 110 like a common bicycle. A driving force (also referred to as pedaling force) generated by a user pressing down the pedals 110 for rotation thereof is transmitted to a chain 111, and further transmitted to the drive wheel 102 via a sprocket 111a, a one-way clutch 111b and a pedaling force sensor 111c to drive the drive wheel 102.

The pedaling force sensor 111c has a resilient member connecting a rotary shaft of the sprocket 111a to the drive wheel 102, and is adapted to detect the movement of a magnet displaced by the distortion of the resilient member by means of a detection coil.

The one-way clutch 111b prevents the driving force from being transmitted from the drive wheel 102 to the chain 111 when a rotational speed of the drive wheel 102 to be produced by the pedaling force is higher than the actual rotational speed of the drive wheel 102.

The electromotive driving means 112 for driving the drive wheel 102 in cooperation with the man-power driving means 109 uses a chargeable battery 113 provided above the drive wheel 102 as a power supply. The power is supplied from the battery 113 to an electric motor 114 provided on a hub of the drive wheel 102.

In the electromotive driving means 112, the output of the electric motor 114 is decelerated by a deceleration mechanism 114a including gears and a belt, and transmitted to the drive wheel 102 via a one-way clutch 114b and a bicycle speed sensor 114c. The one-way clutch 114b prevents the driving force from being reversely transmitted from the drive wheel 102 to the electric motor 114 when a rotational speed of the drive wheel 102 to be produced by the electric motor 114 is higher than the actual rotational speed of the drive wheel 102.

The bicycle speed sensor 114c is a rotary encoder disposed on the rotary shaft of the drive wheel 102 for outputting a pulse signal on a frequency directly proportional to the rotational speed of the drive wheel 102.

Next, an explanation will be given to a control circuit of the motorized bicycle with reference to FIG. 18.

Figure 18:
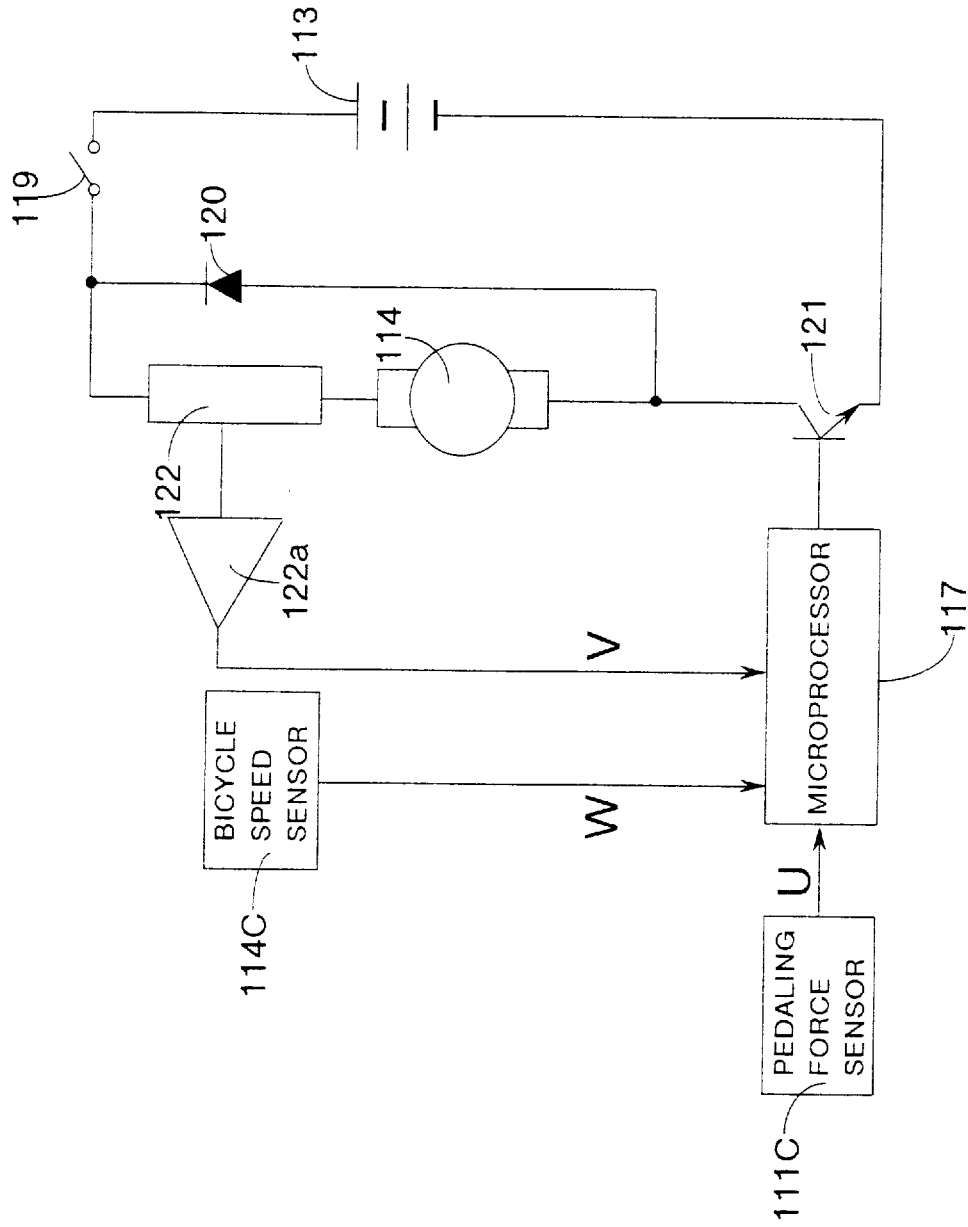
FIG. 18 is a circuit diagram illustrating a control circuit according to EMBODIMENT 2.

As shown in FIG. 18, a voltage of the battery 113 is applied to a serial circuit of the electric motor 114 and a motor current sensor (hereinafter referred to simply as "current sensor") 122 via a switching element 121 and a power switch 119. A fly-wheel diode 120 is connected to the serial circuit.

A microprocessor 117 includes a CPU, an ROM and an RAM. The microprocessor 117 receives and processes signals outputted from the bicycle speed sensor 114c, the current sensor 122 and the pedaling force sensor 111c, and outputs a pulse signal to the switching element 121. It is noted that the output voltage of the current sensor 122 is amplified by an amplifier 122a to be inputted to the microprocessor 117.

In this embodiment, a DC brush motor of permanent magnet exciting type (the maximum output: 300 W) is used as the electric motor 114. A 24-V, 5-Ah nickel-cadmium battery is used as the battery 113, and a 2.25-mn shunt resistor is used as the current sensor 122. The microprocessor 117 turns on and off the switching element 121 on a frequency of 244 Hz to control the electric motor 114 by pulse width modulation (PWM).

With this construction, when the power switch 119 is turned on and the user pedals the motorized bicycle, the pedaling force is transmitted to the drive wheel 102 via the chain 111.

The microprocessor 117 removes offsets from an output signal U of the pedaling force sensor 111c and an output signal V of the amplifier 122a to obtain corrected signals Ur and Vr, which are amplified with amplification factors A and B, respectively. The microprocessor 117 changes the duty ratio of the switching element 121 on the basis of a difference (A−Ur−B−Vr) between the amplified signals to control the output of the electric motor 114 to satisfy an equation of A−Ur=B−Vr. Then, the microprocessor 117 changes the amplification factors A and B on the basis of an output signal W of the bicycle speed sensor 114c.

Figure 19:
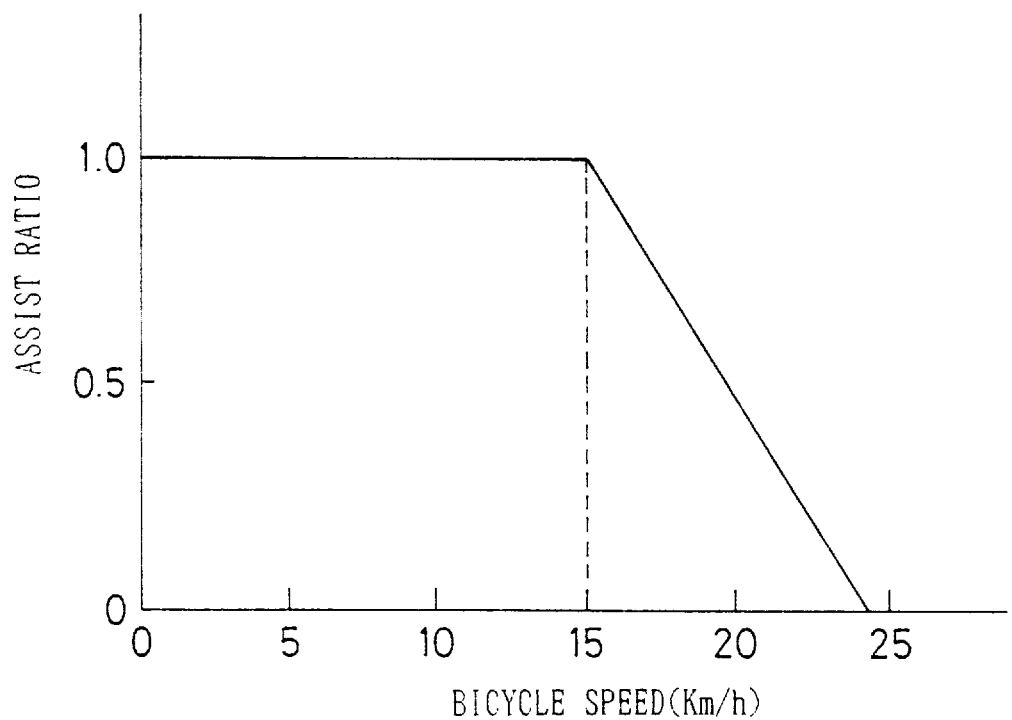
FIG. 19 is a graphical representation illustrating a characteristic of the bicycle speed versus the assist ratio according to EMBODIMENT 2.

Thus, a characteristic of the bicycle speed versus the assist ratio as shown in FIG. 19 is obtained, in which (main driving force)=(auxiliary driving force) (assist ratio=1) when the bicycle speed is lower than 15 Km/h, the auxiliary driving force is linearly reduced when the bicycle speed is not lower than 15 Km/h, and the auxiliary driving force is zero when the bicycle speed is not lower than 24 Km/h.

There will next be described processes for calibrating the outputs of the respective sensors which are performed by the microprocessor 117.

(1) Calibration of output of current sensor

Figure 20:
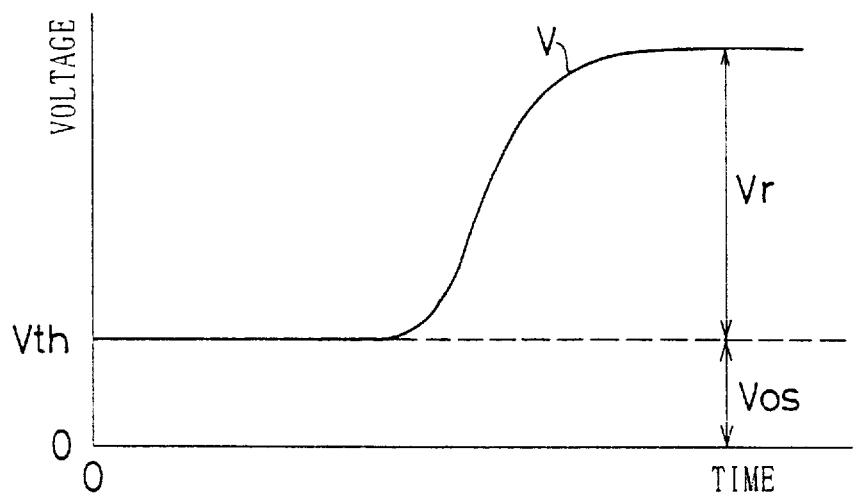
FIGS. 20 and 21 are graphical representations illustrating changes in sensor output with time lapse.

As shown in FIG. 18, the output of the current sensor (shunt resistor) 122 is amplified by the amplifier 122a and inputted into the microprocessor 117. Therefore, the output voltage V of the amplifier 122a includes a net detection voltage Vr corresponding to the current of the electric motor and an offset voltage Vos as shown in FIG. 20.

Immediately after the turn-on of the power switch 119 (when the bicycle is supposedly stopped), the output voltage of the amplifier 122a is read out as a reference value Vth which is considered to correspond to the offset voltage, and a true detection voltage Vr is calculated from the following equation:

$$Vr = V - Vth \qquad (1)$$

Figure 21:
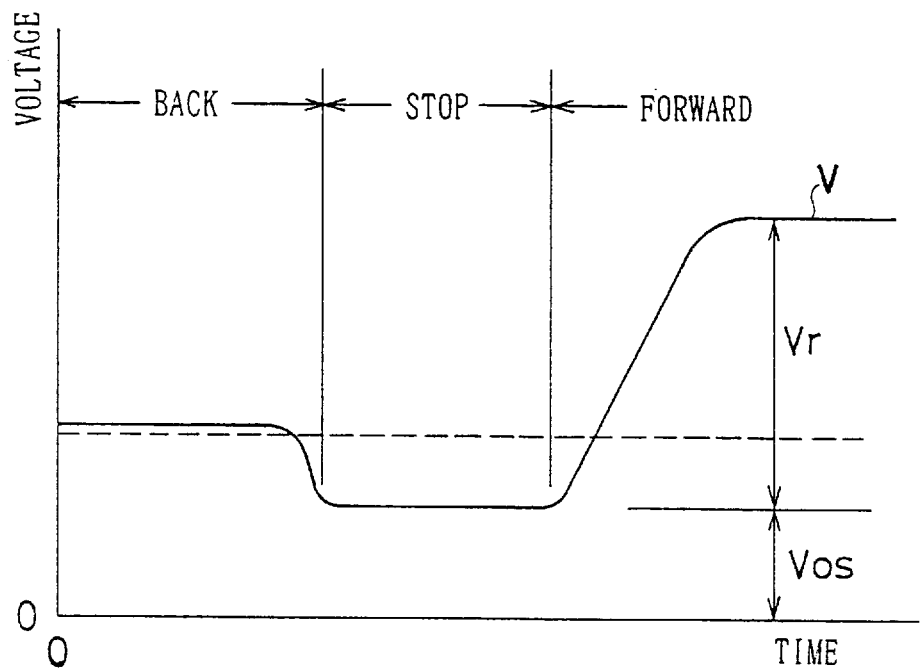

If the user turns on the power switch 119 when moving back the motorized bicycle 101, however, the electric motor 114 is reversely rotated to generate an electromotive force. Therefore, even if the switching element 121 is off, current flows through the current sensor 122 via the fly-wheel diode 120. As a result, a voltage higher than the actual offset voltage Vos is employed as the reference voltage Vth as shown in FIG. 21 and, hence, the true detection voltage Vr cannot be determined from the equation (1).

Figure 22:
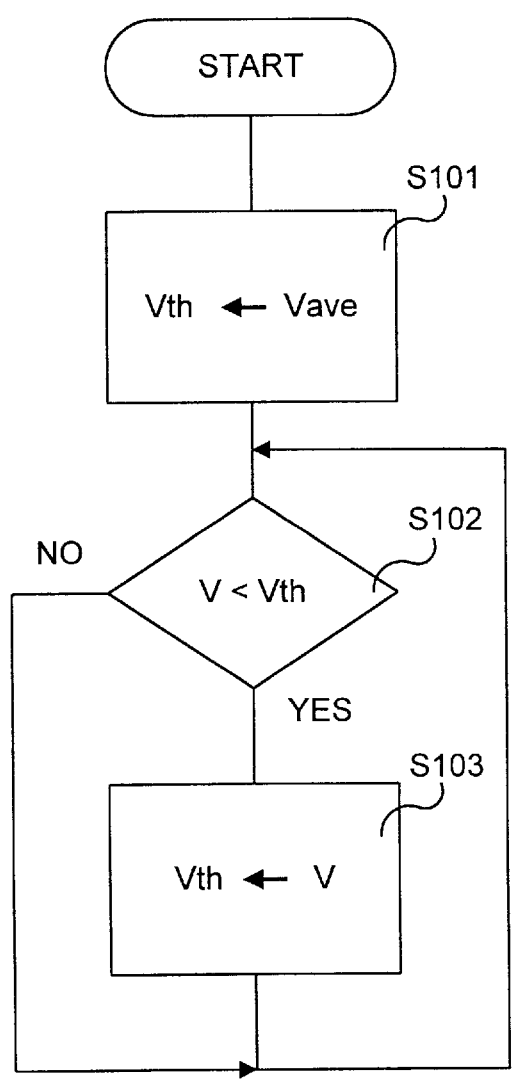
FIG. 22 is a flow chart for illustrating the operation of the motorized bicycle according to EMBODIMENT 2.

To cope with this problem, the microprocessor 117 performs a process as shown in FIG. 22.

Referring to FIG. 22, the outputs V of the amplifier 122a detected during a predetermined period (e.g., during a several-second period) are averaged, and the average Vave is employed as the reference value Vth (Step S101). If the output V is smaller than the reference value Vth (Step S102), the reference value Vth is updated by employing the output V as a new reference value Vth (Step S103), and the detection value Vr is calculated from the equation (1). The output V to be employed in Steps S102 and S103 is preferably the maximum of the outputs of the amplifier 122a detected during a relatively short period, for example, during a 30 msec period.

The outputs of the amplifier 122a may include a noise. Therefore, the accuracy of the reference value is increased by updating the reference value when the maximum of the outputs detected during the 30 msec period is smaller than the reference value Vth, i.e., when the outputs detected during the 30 msec period are all smaller than the reference value Vth.

Figure 23:
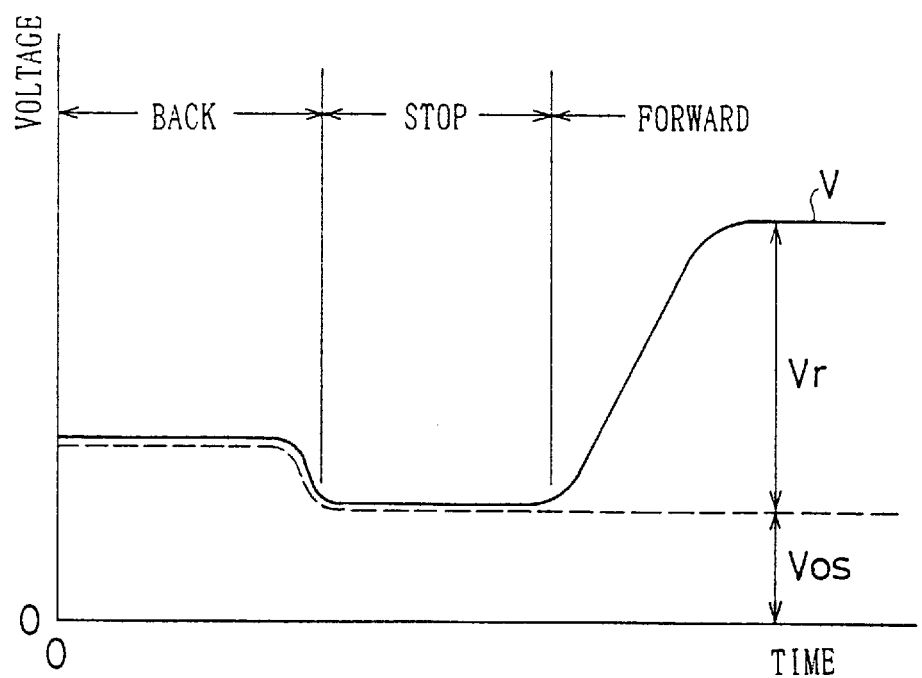
FIG. 23 is a graphical representation illustrating a change in sensor output with time lapse.

Since the reference value Vth is constantly updated to a lower level, the reference value Vth reaches a correct reference value until the current of the electric motor becomes zero as shown in FIG. 23. Therefore, the microprocessor 117 can accurately determine the current of the electric motor (auxiliary driving force) from the equation (1).

Figure 24:
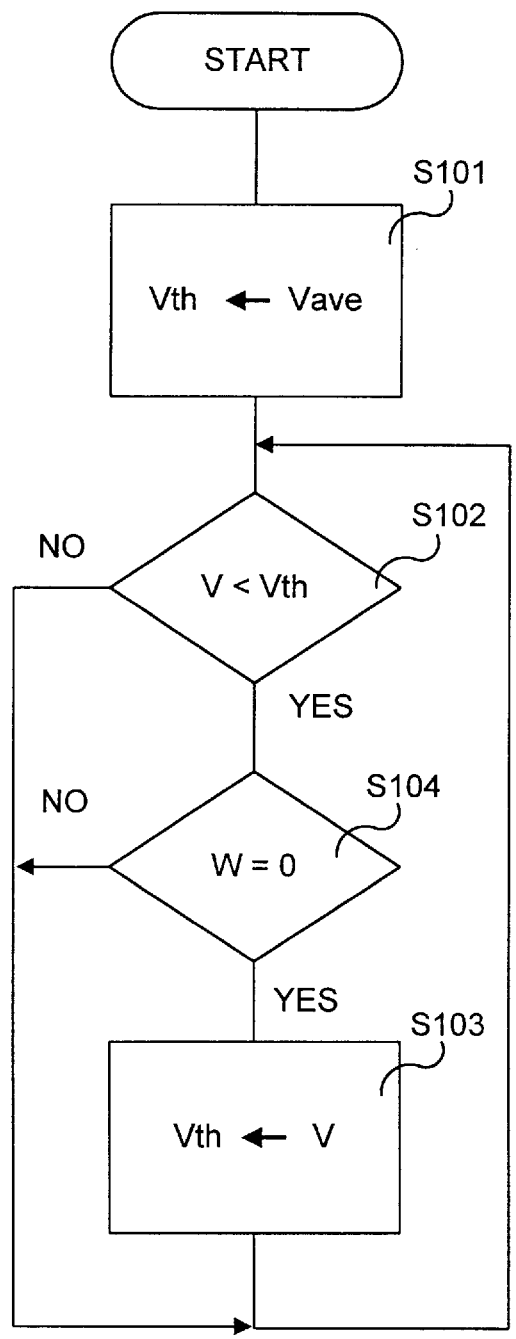
FIGS. 24 and 25 are flow charts for illustrating the operation of the motorized bicycle according to EMBODIMENT 2.

FIG. 24 is a flow chart in which Step S104 is inserted between Steps S102 and S103 of the flow chart of FIG. 22. In Step S104, it is confirmed on the basis of the output W of the bicycle speed sensor 114c that the bicycle speed is zero. Therefore, the reference value Vth can be updated to a more accurate value in Step S103.

(2) Correction of output of pedaling force sensor

The output of the pedaling force sensor 111c includes an offset voltage. The output of the pedaling force sensor 111c can be corrected by updating the reference value to a lower level in the same manner as in Steps S111 to S113 of FIG. 25 for the correction of the output of the current sensor. However, this correction method cannot be employed where the offset voltage is increased by a temperature drift.

Figure 25:
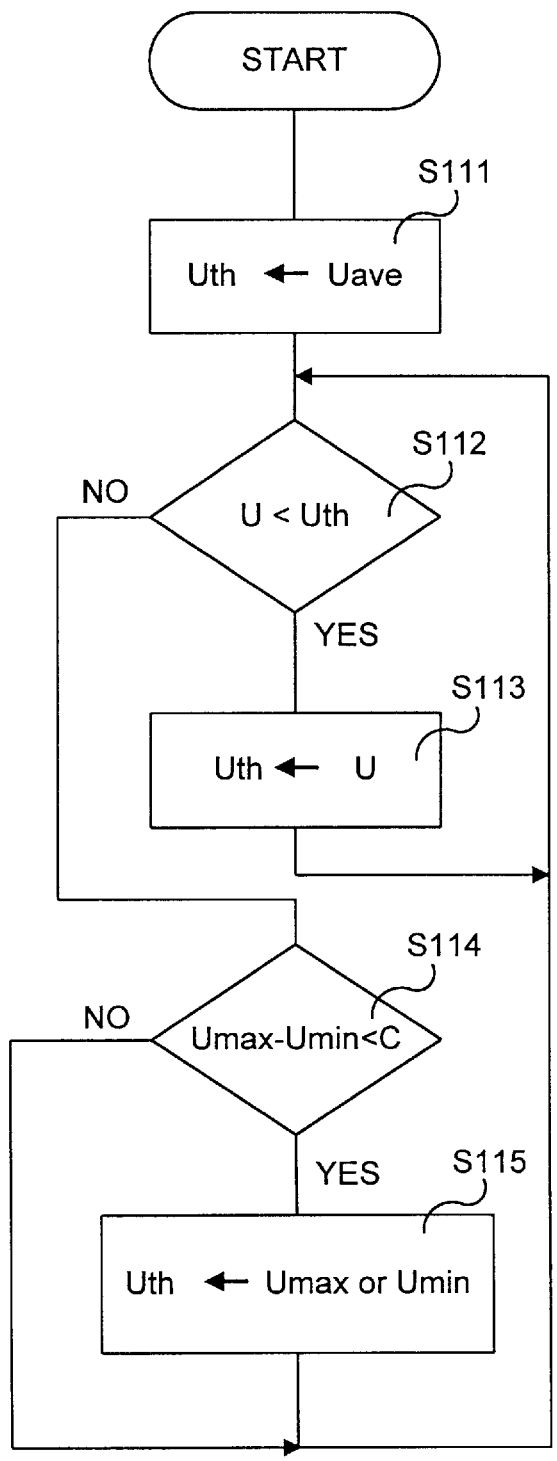

To cope with this problem, the microprocessor 117 performs a process of Steps S114 and S115 shown in FIG. 25.

More specifically, if it is judged in Step S112 that the output U of the sensor 111c is greater than the reference value Uth determined in step S111, a difference between the maximum Umax and the minimum Umin of the outputs detected during a predetermined period T (the maximum fluctuation cycle of the pedaling force during the traveling of the bicycle: about 4 sec) is calculated. Then, if the difference ΔV is smaller than a predetermined value C (Step S114), the maximum value Umax or the minimum value Umin is employed as a new reference value Uth (Step S115). A detection value is calculated from the following equation (2):

$$Ur = U - Uth \qquad (2)$$

More specifically, the reference value Uth is obtained in the following manner in accordance with the flow chart shown in FIG. 25.

Figure 26:
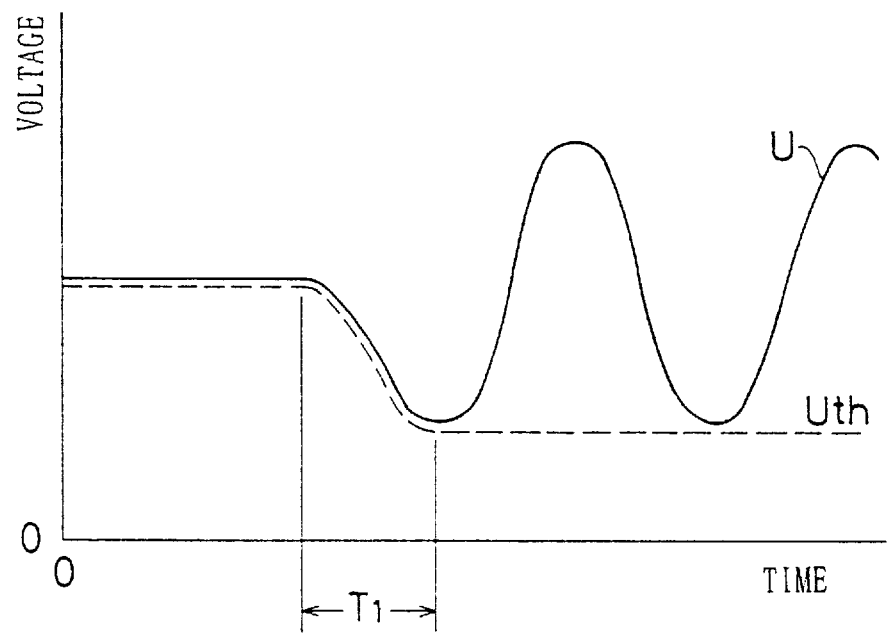
FIGS. 26 and 27 are graphical representations illustrating changes in sensor output with time lapse.

(1) When the output U decreases, the reference value Uth is updated to the minimum of outputs U during a period T1 as shown in Steps S111 to S113 of FIG. 25 even if the reference value Uth is initially set higher than an actual level. Thus, the reference value Uth finally reaches a correct value as shown in FIG. 26.

Figure 27:
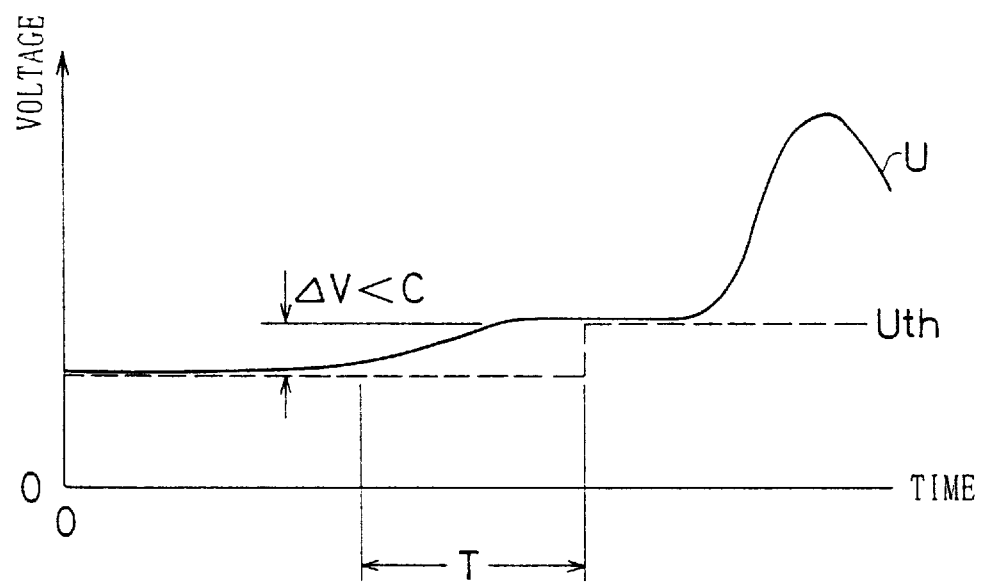

(2) When the output U increases, it is impossible to determine whether the increase in the output U is caused by the drift or by the increase in the pedaling force. Therefore, if the range of output fluctuation or a difference between the maximum Umax and the minimum Umax of the outputs detected during a predetermined period T (about 4 sec) is smaller than the range of fluctuation in the pedaling force observed during the normal traveling of the bicycle (or if the fluctuation range is smaller than the predetermined range value C), it is assumed that no pedaling force is applied, and the reference value Vth is updated by employing the maximum value Umax detected during the period T as a new reference value as shown in FIG. 27.

Figure 28:
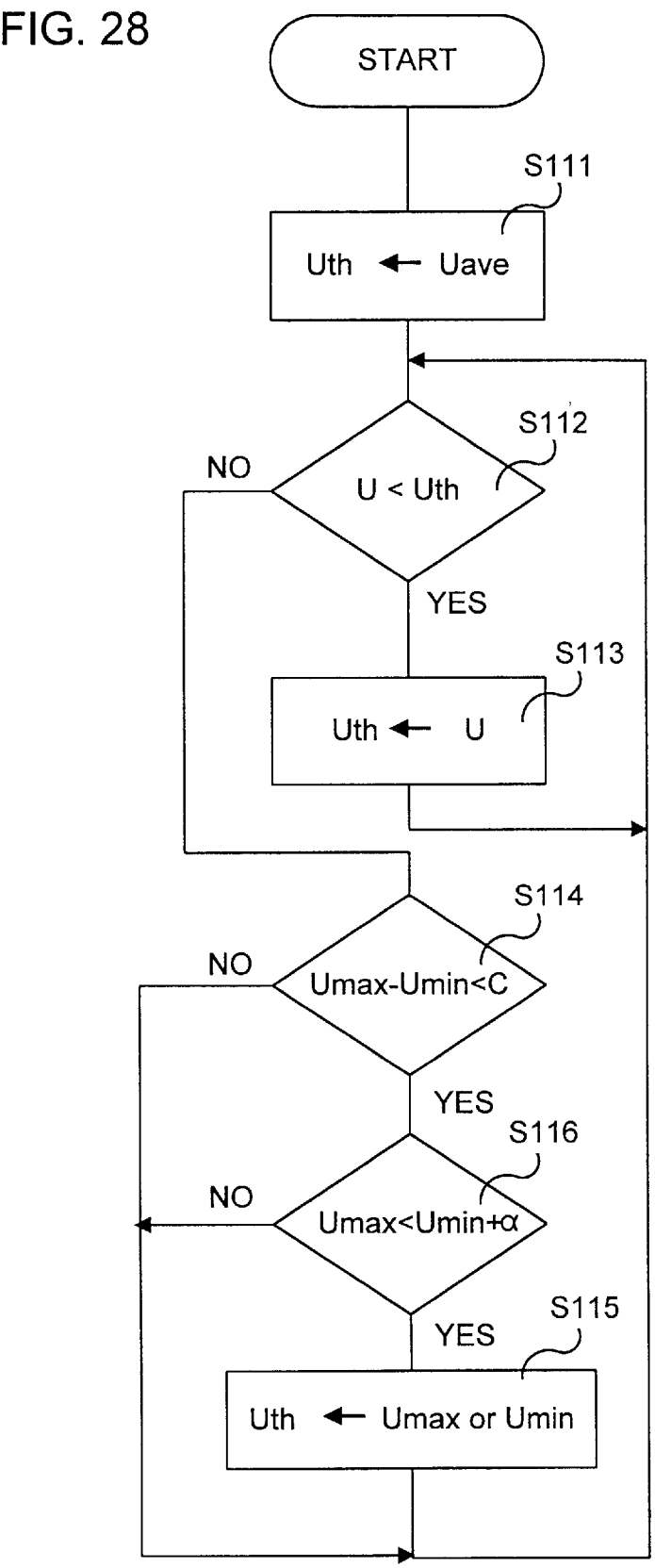
FIG. 28 is a flow chart for illustrating the operation of the motorized bicycle according to EMBODIMENT 2.

FIG. 28 is a flow chart in which Step S116 is inserted between Steps S114 and S115 of the flow chart of FIG. 25. In Step S116, it is judged if a difference between the maximum Umax of the outputs obtained in Step S114 and the present reference value Uth is smaller than a reference-value updatable range a. If the difference is smaller than the range a, the maximum output value Umax (or the minimum output value Umin) is employed as a new reference value Uth.

Figure 29:
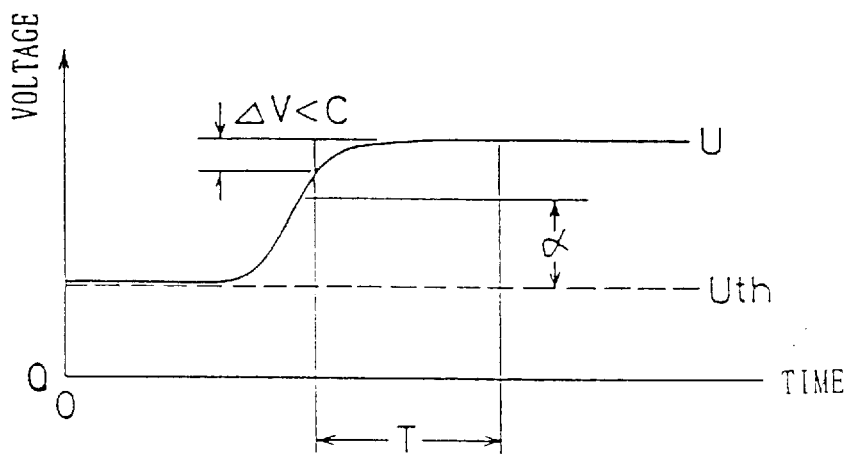
FIGS. 29 and 30 are graphical representations illustrating changes in sensor output with time lapse.

If the sensor output is generally constant or the fluctuation range of the output is small, there is a possibility that the user places his foot on a pedal when the bicycle is stopped. Therefore, even if the fluctuation range ΔU of the sensor output U is small as shown in FIG. 29, the reference value is not updated when the sensor output U is excessively greater (by an amount exceeding a) than the present reference value Uth. Thus, a more accurate reference value Uth can be obtained.

Figure 30:
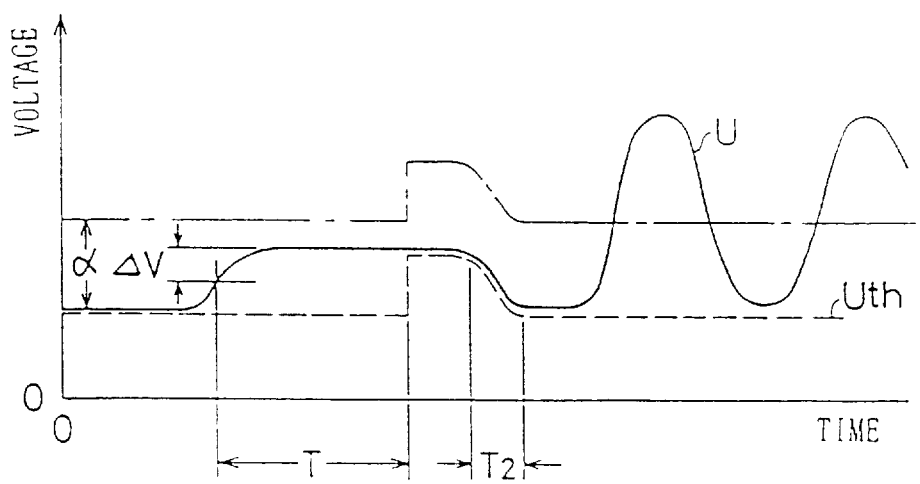
Figure 31:
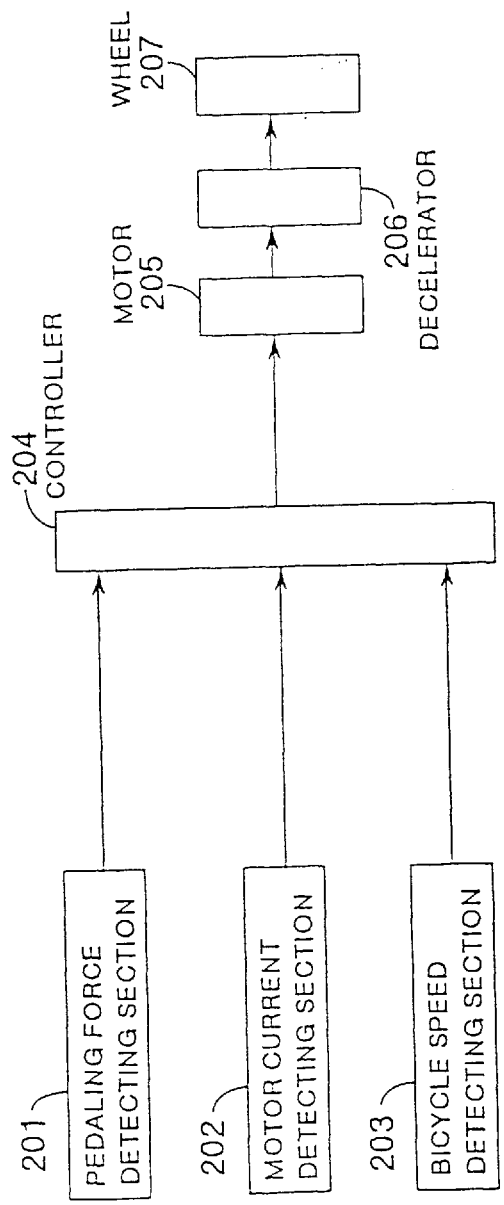
FIG. 31 is a block diagram illustrating a control circuit of a conventional motorized bicycle.

Further, even if the reference value Uth is mistakenly updated by employing a sensor output detected when the user stops the bicycle and slightly places his foot on the pedal (or a small pedaling force is applied), Steps S111 to S113 ensures that the reference value Uth is updated to an accurate reference value during a period T2 (see FIG. 30) immediately after the traveling of the bicycle is started.

The sensor output U to be employed in Steps 112 and S113 of FIGS. 25 and 28 is preferably the maximum of the sensor outputs detected during the 30 msec period, similarly to Steps S102 and S103 of FIGS. 22 and 24.

Thus, the microprocessor 117 calculates an accurate detection value Ur from the equation (2) on the basis of the obtained reference value Uth.

In this embodiment, the sensor correction means corrects an output of at least either one of the pedaling force sensor or the assist force sensor by subtracting a predetermined reference value from the sensor output to obtain a true detection value and, if the sensor output is smaller than the reference value, the reference value updating means updates the reference value by employing the sensor output as a new reference value. The control means controls the output of the electric motor on the basis of the obtained detection value.

The reference value updating means performs the aforesaid updating process when the bicycle speed is zero.

If a difference between the maximum and the minimum of sensor outputs detected during a predetermined period is within a predetermined range when the sensor outputs are greater than the present reference value, the reference value updating means preferably updates the reference value by employing the maximum or minimum sensor output as a new reference value.

If a difference between a present reference value and the maximum of sensor outputs detected during a predetermined period is not greater than a predetermined value when the sensor outputs are greater than the present reference value, the reference value updating means more preferably updates the reference value by employing the maximum or minimum of the sensor outputs detected during the predetermined period as a new reference value.

If a difference between the maximum and the minimum of sensor outputs detected during a predetermined period is within a predetermined range and a difference between a present reference value and the maximum sensor output is not greater than a predetermined value when the sensor outputs are greater than the present reference value, the reference value updating means still more preferably updates the reference value by employing the maximum or minimum value as a new reference value.

In accordance with the present invention, the operation of the electromotive driving means is stopped if the fluctuation range of the driving force detected by the man-power sensor is kept smaller than a predetermined range value for more than a predetermined time period. Therefore, wasteful power consumption can be prevented by stopping the operation of the electromotive driving means when the motorized bicycle is not pedaled.

Where the motorized bicycle further includes the bicycle speed sensor and is adapted to stop the operation of the electromotive driving means only when the pedaling force is not fluctuated and no output is applied from the bicycle speed sensor, the operation of the electromotive driving means can be stopped only when the motorized bicycle is stopped and is not pedaled. This allows for more reliable control of the electromotive driving means.

Where the motorized bicycle is adapted to update the threshold value stored in the threshold value comparing means by employing a sum of a predetermined value and a driving force detected by the man-power sensor as a new threshold value when the fluctuation range of the pedaling force is kept smaller than a predetermined range value for more than a predetermined time period and the operation of the electromotive driving means is stopped, the electromotive driving means is prevented from being operated again immediately thereafter.

Where the motorized bicycle further includes the threshold value lowering means, the threshold value can be updated to be lowered. Therefore, the threshold value once updated to a higher level can be updated to a lower level.

The reference value is updated by employing the minimum sensor output as a new reference value. Therefore, the reference value can be appropriately updated even during a period when the pedaling force or assist force is generally zero. Thus, the pedaling force or assist force can be accurately detected.

In such a case, the reference value is updated when the bicycle speed is zero (i.e., when the pedaling force or assist force is considered to be zero). Therefore, the reference value can be more accurately updated.

Where the motorized bicycle is adapted, if a difference between the maximum and the minimum of sensor outputs detected during a predetermined period is within a predetermined range when the sensor outputs are greater than a present reference value, to update the reference value by employing the maximum or minimum sensor value as a new reference value, the reference value can be accurately updated even if the offset of the sensor output increases due to a drift.

Where the motorized bicycle is adapted, if a difference between the maximum and the minimum of sensor outputs detected during a predetermined period is less than a predetermined value when the sensor outputs are greater than a present reference value, to update the reference value by employing the maximum or minimum sensor value as a new reference value, the reference value can be accurately updated even if the offset of the sensor output increases due to a drift.

Where the motorized bicycle is adapted, if a difference between the maximum and the minimum of sensor outputs detected during a predetermined period is within a predetermined range and a difference between the maximum sensor output and a present reference value is not greater than a predetermined value when the sensor outputs are greater than the present reference value, to update the reference value by employing the maximum or minimum sensor value as a new reference value, the reference value can be accurately updated even if the offset of the sensor output increases due to a drift.

The invention being thus described, it will be obvious that the same may be varied in many ways. Such variations are not to be regarded as a departure from the spirit and scope of the invention, and all such modifications as would be apparent to those skilled in the art are intended to fall within the scope of the following claims.

What is claimed is:

1. A motorized bicycle comprising:

man-power driving means for driving a wheel by man-power;

a man-power sensor for detecting a driving force of the man-power driving means;

electromotive driving means for driving the wheel by an electric motor;

an electromotive-power sensor for detecting a driving force of the electromotive driving means;

control means for controlling the driving force of the electromotive driving means on the basis of signals from the man-power sensor and the electromotive-power sensor; and amplitude detecting means for detecting an amplitude representing a difference between a substantially maximum driving force and a substantially minimum driving force detected by the man-power sensor, wherein the control means includes: (i) operation stopping means for comparing the amplitude detected by the amplitude detecting means with a predetermined value, and stopping the operation of the electromotive driving means in response to a result of the comparison; (ii) operation starting means for comparing the driving force detected by the man-power sensor with a predetermined threshold value and for starting the operation of the electromotive driving means when the driving force detected by the man-power sensor exceeds the predetermined threshold value; and (iii) threshold value updating means for comparing the amplitude detected by the amplitude detecting means with the predetermined value and updating the predetermined threshold value to a sum of the predetermined value and the driving forces detected by the man-power sensor if the detected amplitude is smaller than the predetermined value for more than a predetermined time period.

2. A motorized bicycle as set forth in claim 1, wherein the operation stopping means functions when the amplitude detected by the amplitude detecting means is smaller than the predetermined value for more than a predetermined time period.

3. A motorized bicycle as set forth in claim 1 further comprising a bicycle speed sensor for detecting the speed of the bicycle, wherein the operation stopping means functions when the amplitude detected by the amplitude detecting means is kept smaller than the predetermined value for more than the predetermined time period and no output is applied from the bicycle speed sensor.

4. The bicycle of claim 1, wherein said stopping means stops the electromotive driving means when the detected amplitude is below said predetermined value.

5. The bicycle of claim 1, wherein said detected amplitude is substantially free from noise components present in said substantially maximum and said substantially minimum driving force.

6. A motorized bicycle comprising:

man-power driving means for driving a wheel by man-power;

a man-power sensor for detecting a driving force of the man-power driving means;

electromotive driving means for driving the wheel by an electric motor;

an electromotive-power sensor for detecting a driving force of the electromotive driving means;

control means for controlling the driving force of the electromotive driving means on the basis of signals from the man-power sensor and the electromotive-power sensor; and amplitude detecting means for detecting the range of fluctuation in the driving force detected by the man-power sensor, wherein the control means includes operation starting means for comparing the driving force detected by the man-power sensor with a predetermined threshold value and for starting the operation of the electromotive driving means when the driving force detected by the man-power sensor exceeds the predetermined threshold value, and threshold value updating means for comparing the amplitude detected by the amplitude detecting means with a predetermined range value and updating the predetermined threshold value to a sum of a predetermined value and the driving force detected by the man-power sensor if the detected amplitude is kept smaller than the predetermined range value for more than a predetermined time period.

7. A motorized bicycle as set forth in claim 6, wherein the control means further includes threshold value lowering means for comparing the predetermined threshold value with the sum of the predetermined value and the driving force detected by the man-power sensor and lowering the predetermined threshold value for the updating thereof by employing the sum as a new predetermined threshold value if the sum is smaller than the predetermined threshold value.

8. A motorized bicycle comprising:

man-power driving means for driving a wheel by man-power;

a man-power sensor for detecting a driving force of the man-power driving means;

electromotive driving means for driving the wheel by an electric motor;

an electromotive-power sensor for detecting a driving force of the electromotive driving means; and control means for controlling the driving force of the electromotive driving means on the basis of signals from the man-power sensor and the electromotive-power sensor, wherein the control means includes sensor correction means for correcting an output of at least one of the man-power sensor and the electromotive-power sensor by employing as a sensor detection value a value obtained by subtracting a predetermined reference value from the sensor output, and reference value updating means for updating the predetermined reference value by employing the sensor output as a new reference value if the sensor output is smaller than the predetermined reference value.

9. A motorized bicycle as set forth in claim 8 further comprising a bicycle speed sensor for detecting the speed of the bicycle, wherein the reference value updating means updates the reference value when the speed of the bicycle is zero.

10. A motorized bicycle as set forth in claim 8 wherein, the reference value updating means updates the reference value by employing the maximum or minimum sensor output as a new reference value if a difference between the maximum and the minimum of sensor outputs detected during a predetermined period is within a predetermined range when the sensor outputs are greater than a present reference value.

11. A motorized bicycle as set forth in claim 8 wherein, the reference value updating means updates the reference value by employing the maximum or minimum sensor output as a new reference value if a difference between a present reference value and the maximum of sensor outputs detected during a predetermined period is not greater than a predetermined value when the sensor outputs are greater than the present reference value.

12. A motorized bicycle as set forth in claim 8 wherein, the reference value updating means updates the reference value by employing the maximum or minimum sensor output as a new reference value if a difference between the maximum and the minimum of sensor outputs detected during a predetermined period is within a predetermined range and a difference between a present reference value and the maximum sensor output is not greater than a predetermined value when the sensor outputs are greater than the present reference value.

13. A motorized bicycle comprising:
- a manual drive mechanism which drives a wheel manually;
- a first sensor that detects a driving force of the manual drive mechanism;
- an electric motor;
- a second sensor which detects a driving force of the electric motor;
- a control system which controls the driving force of the electric motor on the basis of signals from the first sensor and the second sensor; and
- an amplitude detecting system which detects an amplitude representing a difference between a substantially maximum driving force and a substantially minimum driving force detected by the first sensor,
- wherein the control system includes: (i) an operation stopping system for comparing the amplitude detected by the amplitude detecting system with a predetermined value, and stopping the operation of the electric motor in response to a result of the comparison; (ii) an operation starting system that compares the driving force detected by the first sensor with a predetermined threshold value and for starting the operation of the electric motor when the driving force detected by the first sensor exceeds the predetermined threshold value; and (iii) a threshold value updating system that compares the amplitude detected by the amplitude detecting system with the predetermined value and updates the predetermined threshold value to a sum of the predetermined value and the driving forces detected by the first sensor if the detected amplitude is smaller than the predetermined value for more than a predetermined time period.

14. A motorized bicycle as set forth in claim 13, wherein the operation stopping system operates when the amplitude detected by the amplitude detecting system is smaller than the predetermined value for more than a predetermined time period.

15. A motorized bicycle as set forth in claim 13 further comprising a bicycle speed sensor for determining the speed of the bicycle, wherein the operation stopping system operates when the amplitude detected by the amplitude detecting system is smaller than the predetermined value for more than the predetermined time period and no output is provided by the bicycle speed sensor.

* * * * *